United States Patent
Nakamura et al.

(10) Patent No.: US 9,698,902 B2
(45) Date of Patent: Jul. 4, 2017

(54) OPTICAL TRANSMISSION SYSTEM AND OPTICAL TRANSMISSION DEVICE

(71) Applicant: FUJITSU LIMITED, Kawasaki-shi, Kanagawa (JP)

(72) Inventors: Kentaro Nakamura, Machida (JP); Satoru Okano, Yokohama (JP); Yasushi Sugaya, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/736,458

(22) Filed: Jun. 11, 2015

(65) Prior Publication Data

US 2015/0381272 A1 Dec. 31, 2015

(30) Foreign Application Priority Data

Jun. 30, 2014 (JP) .................................. 2014-133656

(51) Int. Cl.
*H04B 10/077* (2013.01)

(52) U.S. Cl.
CPC ................................ *H04B 10/0775* (2013.01)

(58) Field of Classification Search
CPC .. H04B 10/035; H04B 10/073; H04B 10/075; H04B 10/0775; H04B 10/07951–10/07955; H04J 14/0201–14/0205; H04J 14/0212; H04J 14/0216; H04J 14/0204

See application file for complete search history.

(56) References Cited

U.S. PATENT DOCUMENTS

| | | | | |
|---|---|---|---|---|
| 2003/0231888 A1* | 12/2003 | Takashina | ............ | H04B 10/079 398/149 |
| 2004/0067057 A1 | 4/2004 | Akiyama et al. | | |
| 2004/0096214 A1* | 5/2004 | Morreale | ........... | H04B 10/0775 398/33 |
| 2005/0232632 A1* | 10/2005 | Okubo | ............... | H04B 10/2755 398/71 |
| 2009/0060498 A1* | 3/2009 | Libeskind | .......... | H04B 10/0775 398/28 |

(Continued)

FOREIGN PATENT DOCUMENTS

| | | |
|---|---|---|
| JP | 2004-112427 | 4/2004 |
| JP | 2011-82988 | 4/2011 |
| JP | 2012-177580 | 9/2012 |

*Primary Examiner* — David Payne
*Assistant Examiner* — Casey Kretzer
(74) *Attorney, Agent, or Firm* — Staas & Halsey LLP

(57) ABSTRACT

An optical transmission system includes: a first optical transmission device configured to transmit measurement light to an optical transmission line on a first direction; and a second optical transmission device configured, when an optical transmission characteristic is measured, to loop-back the measurement light received from the first optical transmission device through an optical transmission line on the first direction and to transmit the measurement light to the first optical transmission device through an optical transmission line on a second direction, wherein, when the optical transmission characteristic is measured, the first optical transmission device receives the measurement light loop-backed by the second optical transmission device and measures the optical transmission characteristic between the first optical transmission device and the second optical transmission device.

7 Claims, 22 Drawing Sheets

(56) References Cited

U.S. PATENT DOCUMENTS

| | | | |
|---|---|---|---|
| 2011/0085801 A1 | 4/2011 | Palacharla | |
| 2011/0200324 A1* | 8/2011 | Boertjes | H04J 14/0212 398/16 |
| 2012/0219285 A1* | 8/2012 | Dahan | H04B 10/07953 398/26 |
| 2012/0251119 A1* | 10/2012 | McNicol | H04J 14/02 398/91 |
| 2012/0308179 A1* | 12/2012 | Jiang | H04J 14/0212 385/16 |
| 2014/0140691 A1* | 5/2014 | Reaves | G01M 11/3172 398/21 |

* cited by examiner

OPTICAL TRANSMISSION SYSTEM AND OPTICAL TRANSMISSION DEVICE

CROSS-REFERENCE TO RELATED APPLICATION

This application is based upon and claims the benefit of priority of the prior Japanese Patent Application No. 2014-133656, filed on Jun. 30, 2014, the entire contents of which are incorporated herein by reference.

FIELD

The embodiments discussed herein are related to an optical transmission system and an optical transmission device.

BACKGROUND

In the field of optical transmission technology, a technology that measures an optical signal to noise ratio (OSNR) or polarization dependent loss (PDL) or the like as a characteristic of an optical network is under study (see Japanese Laid-open Patent Publication Nos. 2011-082988, 2012-177580, and 2004-112427, for example).

SUMMARY

According to an aspect of the invention, an optical transmission system includes: a first optical transmission device configured to transmit measurement light to an optical transmission line on a first direction; and a second optical transmission device configured, when an optical transmission characteristic is measured, to loop-back the measurement light received from the first optical transmission device through an optical transmission line on the first direction and to transmit the measurement light to the first optical transmission device through an optical transmission line on a second direction, wherein, when the optical transmission characteristic is measured, the first optical transmission device receives the measurement light loop-backed by the second optical transmission device and measures the optical transmission characteristic between the first optical transmission device and the second optical transmission device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
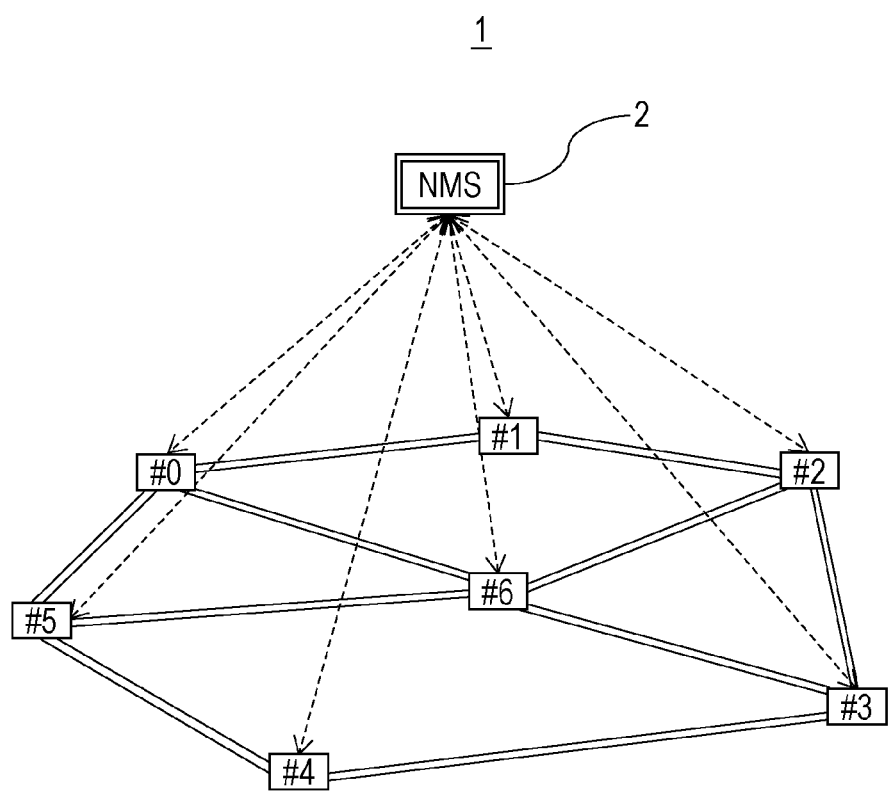
FIG. 1 is a block diagram illustrating a configuration example of an optical transmission system according to one embodiment.

In conventional technologies, it is under study to measure a characteristic of an optical network with an OSNR or PDL or the like, as a characteristic of an optical network, by providing measuring equipment individually on an optical transmission side and an optical reception side.

A technology that enables measurement of an optical transmission characteristic of an optical transmission system without individually providing measuring equipment or the like on a plurality of optical transmission devices which constitute the optical transmission system is hereinafter described with reference to the drawings. Note, however, that embodiments to be described below are only illustrative and not intended to exclude application of different variations or technologies which are not clearly indicated hereinafter. In addition, in the drawings to be used in the following embodiments, a part to which a same numeral symbol is assigned represents a same or similar part, unless otherwise specified.

FIG. 1 is a block diagram illustrating a configuration example of an optical transmission system according to one embodiment. An optical transmission system (which may also be hereinafter referred to as an "optical network") illustrated in FIG. 1 exemplarily includes a plurality of optical transmission devices #0 to #n (n is an integer of 1 or more, and n=6 in an example of FIG. 1). An optical transmission device #i (i=any of 0 to n) may also be represented as nodes #i.

Exemplarily, the nodes #i may be connected by optical transmission lines to be capable of optically communicating with each other. An optical network 1 illustrated in FIG. 1 is an example of an optical mesh network in which the nodes #i are connected like a mesh. However, the optical network 1 may be a network of another form, such as a ring network.

An optical fiber may be used for optical transmission lines connecting the nodes #i. Optical communication among the nodes #i may be a bidirectional optical communications. In the bidirectional optical communications, an optical transmission line may include a pair of optical fibers that correspond to each of two ways. Light transmitted through an optical transmission line may be light of one wavelength or wavelength-division-multiplexed light (WDM light) which is light having a plurality of wavelengths wavelength-multiplexed.

As illustrated in FIG. 1, each of the nodes #i may be connected to be capable of communicating with a network management system (NMS) 2. Exemplarily, an NMS 2 may perform communications related to operation administration and maintenance (OAM) with the nodes #i. The communications may be referred to as OAM communications.

The OAM communications allows control of configuration or operation of the optical network 1. For example, the NMS 2 may use the OAM communications to instruct any of the nodes #i to measure a parameter of the optical network 1.

An example of parameters to be measured includes an optical signal to noise ratio (OSNR), polarization dependent loss (PDL), polarization mode dispersion (PMD), chromatic dispersion (CD) or the like. A parameter of the optical network 1 may be referred to as a "network parameter". A "network parameter" may be taken as an index of the optical transmission characteristic in the optical network 1 and may be referred to as a "network characteristic".

Measurement (observation) of a network parameter makes it possible to know a difference from a parameter assumed (calculated or simulated) in a design phase of the optical network 1, which consequently allows an appropriate action to be taken on the optical network 1.

In optical network designing, exemplarily, transmission performance is calculated by using information on each of an optical transmission line and an optical transmission device #i which constitutes the optical network 1. Information on the optical transmission line (which may be referred to as "transmission line information") may include information on a type of an optical fiber, loss, dispersion, PMD, or the like. Information on the optical transmission device #i (which may be referred to as "optical transmission device information" or "node information") may include information on specifications of an optical transceiver (transponder) or of an optical amplifier, which are used in the optical transmission device #i, or the like.

An example of the transmission performance calculated using the transmission line information or the node information includes noise (OSNR, stated differently), or transmission penalty (chromatic dispersion, PMD, nonlinear effect, or the like). Based on the calculated transmission performance, selection or arrangement or the like of the node #i or the optical transmission line, which are used in the optical network 1, is determined.

In the design phase of the optical network 1, variations of the transmission performance in an optical transmission line or variations in the optical transmission device #i are taken into consideration. An example of the variations of the optical transmission line includes variations in chromatic dispersion characteristics of an optical fiber or variations in nonlinear effect in an optical fiber, or the like.

An example of the variations of the optical transmission device #i includes manufacturing variations of optical transceiver, frequency deviation of a light source, deviation of a center wavelength of optical multiplexing and demultiplexing, variations in chromatic dispersion characteristics of a dispersion-compensating fiber, or the like. Other example of the variations in the optical transmission device #i includes variations in the chromatic dispersion characteristics of an optical multiplexer and demultiplexer or a wavelength selective switch (WSS), characteristic variations of an optical amplifier, or the like.

In the design phase, a margin is provided for a network parameter to take into consideration the variations of the transmission performance in the optical transmission line or the variations in the optical transmission device #i as described above. When the optical network 1 is actually built, however, an extra margin may be reserved or, to the contrary, a margin may be insufficient.

Thus, it is important that an actual network parameter of the optical network 1 may be measured (observed). The importance further increases in the optical network 1 having a high degree of freedom in that a transmission route (which may be referred to as a "path") or a wavelength, a wavelength spacing, or the like may be changed in a flexible manner.

For example, in an existing optical transmission system, while a path may be switched in operation, a path is switched only within a designed range and it may not be stated that the degree of freedom is high. In contrast, in recent years, introduction of an optical network with a significantly high degree of freedom has been under study, in which a wavelength spacing (which may be referred to as a "wavelength grid") is freely changed in order to increase transmission capacity, or frequency utilization efficiency is improved through defragmentation of wavelengths, or the like.

Since such an optical network with the high degree of freedom involves a vast number of network parameters to be designed although the degree of freedom is high, it is difficult to design those network parameters in advance. Hence, in introducing an optical network with a high degree of freedom, it is important that the network parameters of the optical network 1 may be post-observed.

Measurement of the network parameters is feasible by, for example, maintenance personnel visiting a place of installation of each of the nodes #i to connect an optical measuring instrument to the nodes #i, or installing an optical measuring instrument or an optical performance monitor (OPM) at each of the nodes #i. In any case, however, it may not be stated that the measurement method is desirable in terms of cost or time.

In addition, if the optical network 1 is a WDM optical network configured to transmit wavelength-multiplexed light (WDM light), in order to measure light having a plurality of wavelengths, there is no alternative but to perform measurement while reconnecting an optical measuring instrument to a port for each of a wavelength multiplexer (MUX) or a wavelength demultiplexer (DMUX), for example.

Thus, in this embodiment is described a technology capable of measuring a network parameter for any wavelength in any path of the optical network 1 only by arranging a measurement function in one node #i rather than equipping all of the nodes #i with the measurement function.

Figure 2:
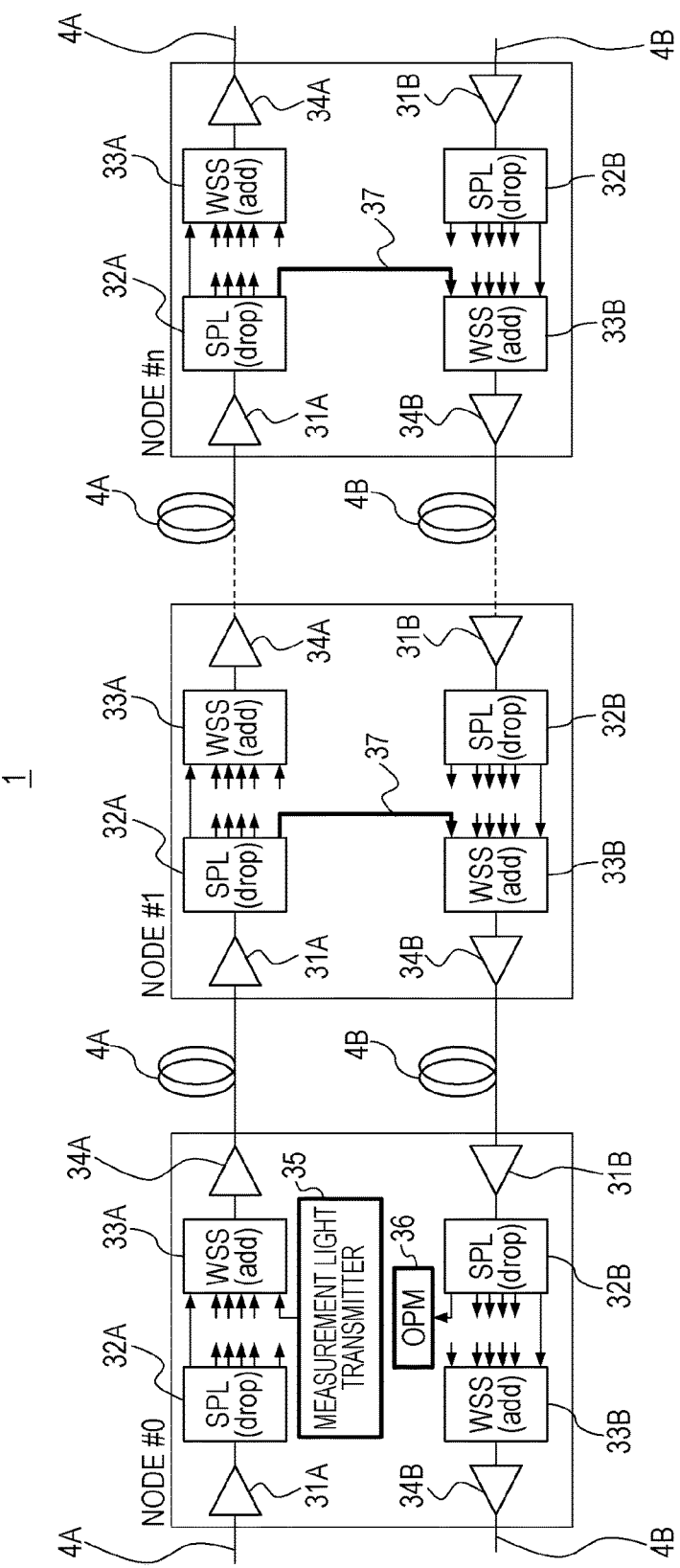
FIG. 2 is a block diagram focusing on a node configuration example of the optical transmission system exemplarily illustrated in FIG. 1.

FIG. 2 is a block diagram focusing on a node configuration example of the node #0 to the node #n of the optical transmission system 1 exemplarily illustrated in FIG. 1. Exemplarily, each of the nodes #i illustrated in FIG. 2 may be a reconfigurable optical add/drop multiplexer (ROADM).

As exemplarily illustrated in FIG. 2, each of the nodes #i is connected with other node #j (j is any of J=0 to n and j≠i) via bidirectional optical transmission lines 4A and 4B so that each of the nodes #i may communicate bidirectionally.

One direction of two ways (a direction from the node #0 to the node #n, for example) may be referred to as "downstream", and a direction opposite to the one direction may be referred to as "upstream". When the optical transmission lines 4A and 4B do not have to be discriminated, the optical transmission lines 4A and 4B may be represented as optical transmission lines 4.

Focus being placed on the downstream, each of the nodes #i exemplarily includes an optical amplifier 31A, an optical splitter (SPL) 32A, a wavelength selective switch (WSS) 33A, and an optical amplifier 34A.

In addition, focus being placed on the upstream, each of the nodes #i exemplarily includes an optical amplifier (preamp) 31B, an optical splitter 32B, a wavelength selective switch (WSS) 33B, and an optical amplifier (post-amp) 34B.

The optical amplifiers 31A and 31B may be respectively referred to as a "preamp" or a "receiving amp". The optical amplifiers 34A and 34B may be respectively referred to as a "post-amp" or a "transmitting amp".

These optical amplifiers 31A, 31B, 34A, and 34B amplify reception signal light or transmission signal light so as to pre- or post-compensate transmission loss or the like to which signal light transmitted through the optical transmission line 4A or 4B is subjected. In some cases, depending on the transmission loss or the like which the signal light has, any of the optical amplifiers 31A, 31B, 34A, and 34B may not be provided.

Note that if the optical amplifiers 31A and 31B may not be distinguished from each other, the optical amplifiers 31A and 31B may be represented as optical amplifiers (preamps or reception amps) 31. In addition, if the SPLs 32A and 32B may not be distinguished from each other, the SPLs 32A and 32B may be represented as SPLs 32. Similarly, if the WSSs 33A and 33B may not be distinguished from each other, the WSSs 33A and 33B may be represented as WSSs 33. If the optical amplifiers 34A and 34B may not be distinguished from each other, the optical amplifiers 34A and 34B may be represented as optical amplifiers (post-amps or transmission amps) 34.

The preamps 31 amplify light received from the optical transmission lines 4 and input the light to the SPLs 32.

The SPLs 32 exemplarily have one input port and a plurality of output ports. Light amplified by the preamps 31 is inputted to the input port and the SPLs 32 branch the inputted light to the plurality of output ports. Any of the branched light outputted from the plurality of output ports of the SPLs 32 corresponds to drop light. In addition, any of other branched light outputted from the plurality of output ports of the SPLs 32 corresponds to through light which is passed-through to the WSSs 33. An output port from which drop light is outputted may be referred to as a drop port and an output port from which through light is outputted may be referred to as a through port.

Note that the SPLs 32 may be alternatively implemented by using a WSS. The downstream-side SPL (or the WSS) 32A is an example of an optical device to which light transmitted through a downstream optical transmission line 4A is inputted and that branches and outputs, or selectively outputs, the light to any of the plurality of output ports. The upstream-side SPL (WSS) 32B is an example of an optical device to which light transmitted through an upstream optical transmission line 4B is inputted and that branches and outputs, or selectively outputs, the light to the plurality of output ports.

The WSSs 33 have a plurality of input ports and one output port. Through light from the SPLs 32 is inputted to any of the plurality of input ports and add light is inputted to any other input port of the plurality of input ports. An input port to which add light is inputted may be referred to as an add port. The WSSs 33 selectively outputs the light, which is inputted to the plurality of input ports, to the output port in terms of a wavelength. The light outputted from the output port is inputted to the post-amps 34.

The post-amps 34 amplify light inputted from the output port of the WSSs 33 and output the light to the optical transmission lines 4.

A measurement light transmitter 35 capable of transmitting light used to measure a network parameter (hereinafter referred to as "measurement light") may be connected to any of the input ports of the WSSs 33 in any node #i.

Stated differently, measurement light may be inputted to the add port of the WSSs 33 as add light. FIG. 2 exemplarily illustrates an aspect in which the measurement light transmitter 35 is connected to one of the add ports of the downstream-side WSS 33A in the node #0. The measurement light transmitter 35 may also be referred to as a "light source unit 35" since the measurement light transmitter 35 is provided with a light source that outputs measurement light, as described below. It may be considered that the measurement light transmitter 35 and the WSS 33A constitute an optical transmitter configured to transmit measurement light to the downstream optical transmission line 4A.

In addition, a measurement light receiver 36 configured to receive measurement light may be connected to one of the output ports on the upstream-side SPL 32B in the node #0 which is provided with the measurement light transmitter 35. Stated differently, measurement light as drop light may be inputted from the drop port of the SPL 32B to the measurement light receiver 36. The measurement light receiver 36 measures a network parameter based on received measurement light. Thus, the measurement light receiver 36 may also be referred to as an "optical performance monitor (OPM) 36" or a "measuring instrument 36". It may be considered that the SPL 32B and the OPM 36 constitute an example of an optical receiver configured to receive measurement light transmitted through the upstream optical transmission line 4B.

The measurement light received by the measurement light receiver 36 is measurement light that is transmitted to the optical transmission line 4A from the measurement light transmitter 35 through the WSS 33A and looped back at any of the other nodes #1 to #n and is returned to the node #0 through the opposed optical transmission line 4B.

In order to enable loop-back of measurement light, as exemplarily indicated by the sign 37 in FIG. 2, one of the output ports of the SPL 32A and one of the input ports of the WSS 33B are optically connected (which may be referred to as "loop-back connection") in the other nodes #1 to #n. An optical fiber may be used for the loop-back connection 37. The optical fiber used for the loop-back connection 37 may be referred to as a loop-back fiber 37 for convenience. It may be considered that the SPL 32A of the nodes #1 to #n constitutes an example of an optical receiver configured to receive measurement light transmitted through the downstream optical transmission line 4A.

The loop-back connection 37 may be fixed connection or connection which may dynamically connect and disconnect input and output ports in which the loop-back connection 37 is formed. An optical switch capable of dynamically switching transmission and blocking of light (which may be hereinafter referred to as a "switch between loop-back ports" for convenience) may be used for dynamic connection and disconnection.

Measurement light included in the light inputted from the SPL 32A to the WSS 33B by the loop-back connection 37 is selected by the upstream-side WSS 33B and transmitted to the upstream optical transmission line 4B. Therefore, it may be considered that the loop-back connection 37 and the WSS 33B constitute an example of an optical transmitter configured to look back and transmit measurement light to the upstream optical transmission line 4B.

With the configuration described above, the optical network 1 exemplarily illustrated in FIG. 2 may add measurement light to light to the downstream in the node #0 which is provided with the measurement light transmitter 35 and may loop back measurement light received by any of the other nodes #1 to #n to the upstream. The looped back measurement light is transmitted to the node #0 through the upstream optical transmission line 4B.

At the node #0, the measurement light receiver 36 receives the measurement light that is thus looped back and returned. Therefore, based on the received measurement light, the measurement light receiver 36 may measure a network parameter for a path (which may be referred to as a "span") from the node #0 to any of the other nodes #1 to #n where the measurement light is looped back.

Stated differently, if one node #0 in the optical network 1 is provided with the measurement light transmitter 35 and the measurement light receiver 36, the node #0 may measure a network parameter of any span. Note that the node #0 provided with the measurement light transmitter 35 and the measurement light receiver 36 may also be referred to as a "measurement node #0".

In addition, if wavelength of light to be transmitted from the measurement light transmitter 35 is changed and a selected waveform at the WSSs 33 is changed (controlled) according to the change, a network parameter of any wavelength used in the optical network 1 may also be measured.

An instruction to start or terminate measurement of a network parameter by the node #0 may be exemplarily given by a control signal from the NMS 2. According to the control signal received from the NMS 2, the node #0 may control start or termination of transmission of measurement light by the measurement light transmitter 35 or start or termination of measurement by the measurement light receiver 36. In addition, according to the control, the node #0 may set (specify) and control the other nodes #1 to #n that loop back measurement light.

Figure 3:
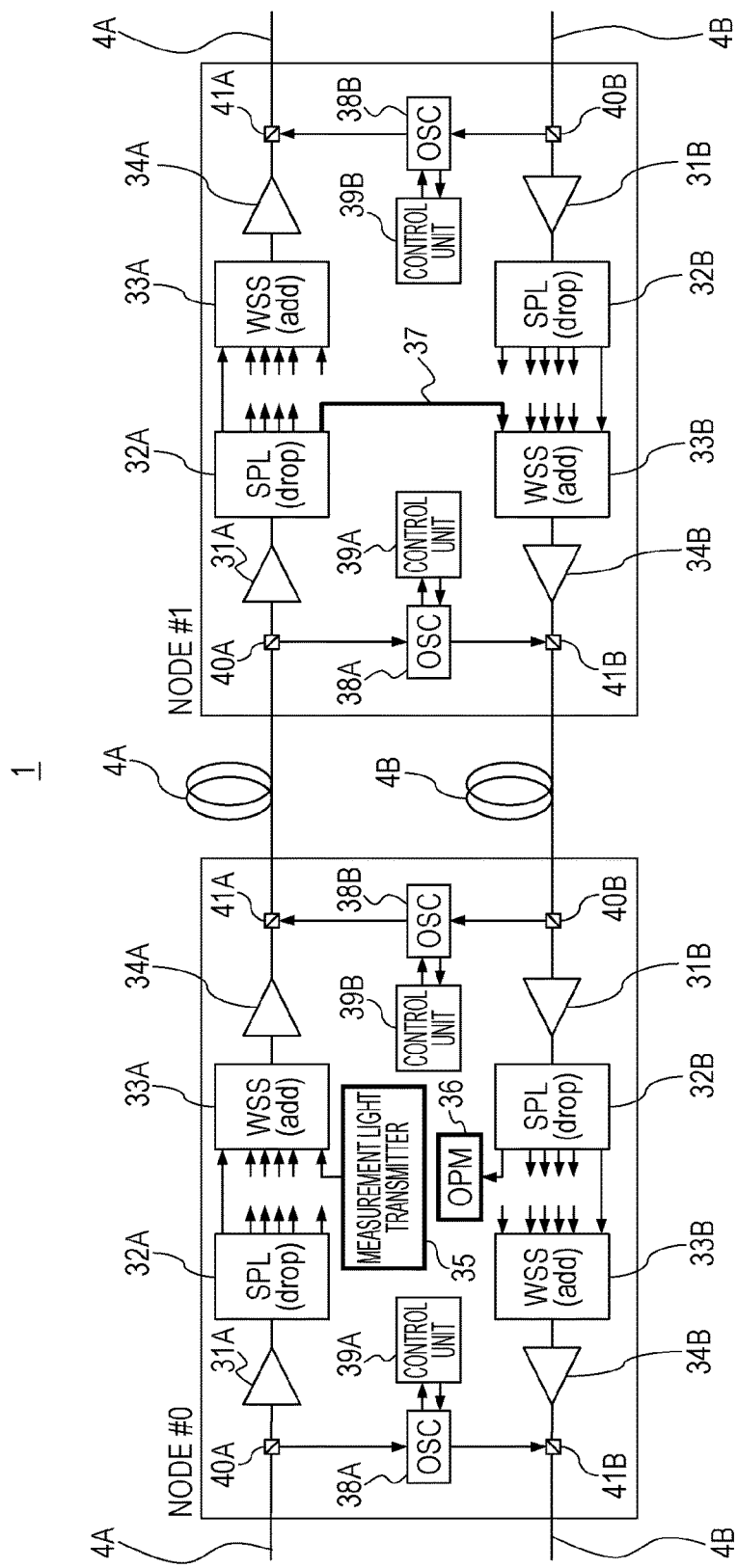
FIG. 3 is a block diagram focused on a node configuration example of the optical transmission system exemplarily illustrated in FIG. 1.

Exemplarily, a control signal that allows setting or control related to measurement, as described above, may be transmitted or received among the nodes #i, by using supervisory control light. The supervisory control light may also be referred to as optical supervisory channel (OSC). FIG. 3 illustrates a configuration example of a node #i capable of transmitting and receiving OSC light. Note that FIG. 3 illustrates a configuration example focusing on the two nodes #0 and #1. It may be considered that a configuration of the other nodes #2 to #n is also same as or similar to the nodes #0 and #1.

The node #0 (#1) illustrated in FIG. 3 exemplarily includes an OSC optical transceiver 38A or 38B and a control unit 39A or 39B.

One OSC optical transceiver 38A exemplarily receives OSC light that is received through the downstream optical transmission line 4A and transmits a control signal indicated by the OSC light to the control unit 39A. In addition, the OSC optical transceiver 38A generates OSC light according to a control signal generated by the control unit 39A and transmits the OSC light to the upstream optical transmission line 4B.

Input (reception) of light including the OSC light from the downstream optical transmission line 4A to the OSC optical transceiver 38A may be exemplarily implemented by an optical branching device 40A provided in the front stage of the preamp 31A. The optical branching device 40A may be a branching coupler and is configured to branch light inputted from the optical transmission line 4A and output the light to the preamp 31A and the OSC optical transceiver 38A.

In addition, input (transmission) of OSC light to the upstream optical transmission line 4B may be exemplarily implemented by an optical multiplexer 41B provided in the back stage of the post-amp 34B. The optical multiplexer 41B may be a multiplexing coupler and is configured to multiplex OSC light transmitted from the OSC optical transceiver 38A to output light of the post-amp 34B and transmit the OSC light to the optical transmission line 4B.

The other OSC optical transceiver 38B is exemplarily configured to receive the OSC light which is received through the upstream optical transmission line 4B and transmit a control signal indicated by the OSC light to the control unit 39B. The OSC optical transceiver 38B also generates OSC light according to the control signal generated by the control unit 39B and transmits the OSC light to the downstream optical transmission line 4A.

Input (reception) of light including the OSC light from the upstream optical transmission line 4B to the OSC optical transceiver 38B may be exemplarily implemented by an optical branching device 40B provided in the front stage of the preamp 31B. The optical branching device 40B may be a branching coupler and is configured to branch light inputted from the optical transmission line 4B and output the light to the preamp 31B and the OSC optical transceiver 38B.

In addition, input (transmission) of the OSC light to the downstream optical transmission line 4A may be exemplarily implemented by an optical multiplexer 41A provided in the back stage of the post-amp 34A. The optical multiplexer 41A may be a multiplexing coupler and is configured to multiplex the OSC light which is transmitted from the OSC optical transceiver 38B to output light of the post-amp 34A and transmit the OSC light to the optical transmission line 4A.

As described above, the control units 39A and 39B are configured to transmit and receive a control signal to and from the other node #j through the corresponding OSC optical transceivers 38A and 38B and control operation of the own node #i according to the control signal. The control may include control related to the measurement of a network parameter, which is already described.

Note that the control units 39A and 39B may be provided individually for the OSC optical transceivers 38A and 38B, as exemplarily illustrated in FIG. 3, or may be integrated and provided as a common control unit to the OSC optical transceivers 38A and 38B. If the control units 39A and 39B may not be distinguished from each other, the control units 39A and 39B may be simply referred to as "control units 39".

The control unit 39 in the node #0 provided with the measurement light transmitter 35 and the measurement light receiver 36 may control a measurement operation by the measurement light transmitter 35 and the measurement light receiver 36. When a wavelength of measurement light (which may be hereinafter referred to as a "measurement wavelength") is changed in control of the measurement operation, the control unit 39 may control a selected wavelength at the WSSs 33 where measurement light is inputted according to the change. Also, the control unit 39 may control the measurement operation of the measurement light receiver 36 according to the change of the measurement wavelength.

Then, an example of a procedure to measure a network parameter by the measurement node #0 is described with reference to FIG. 4.

Figure 4:
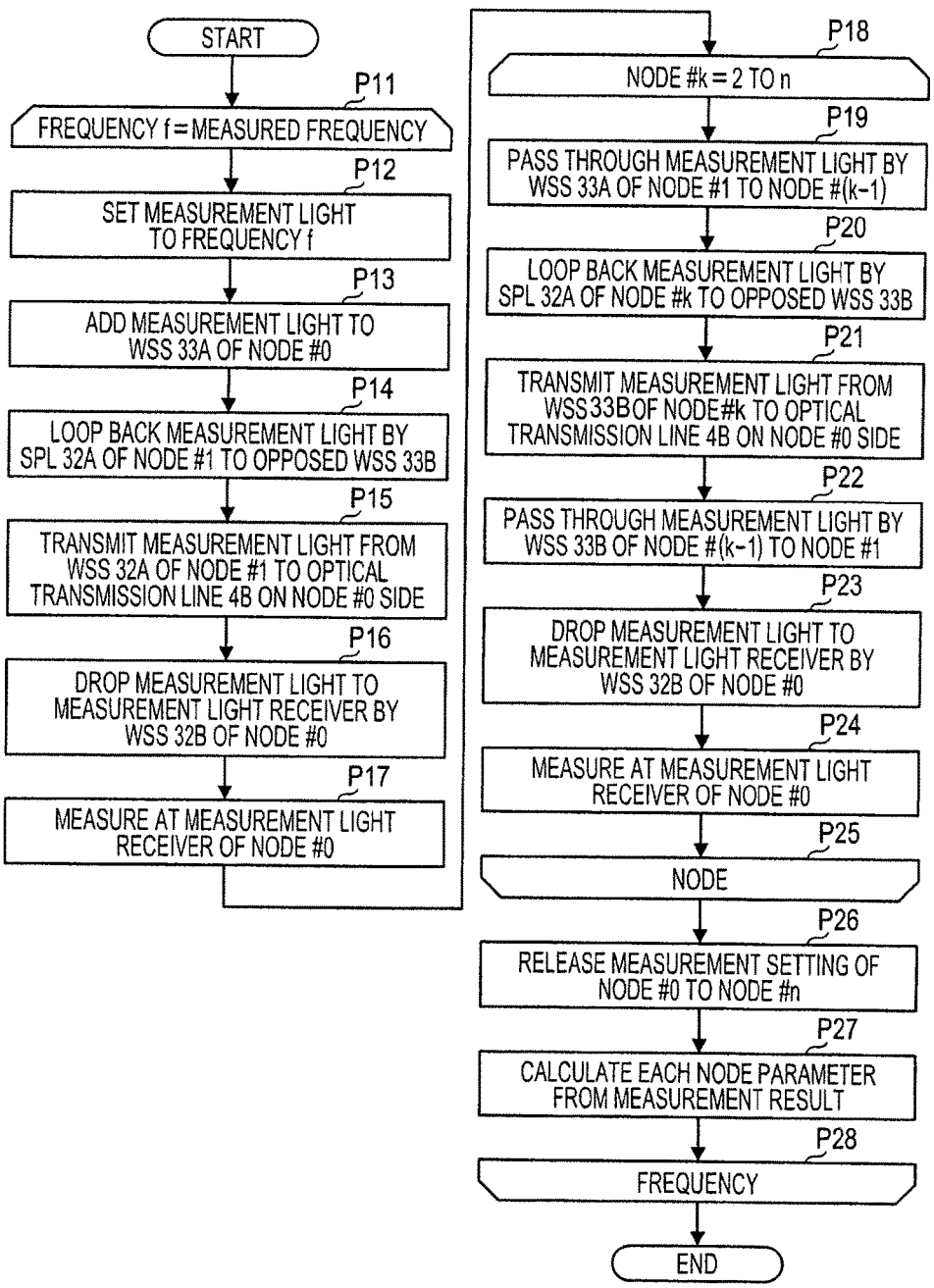
FIG. 4 is a flow chart describing an example of a method for measuring a network parameter in the optical transmission system exemplarily illustrated in FIG. 1 to FIG. 3.

As illustrated in FIG. 4, first, the measurement node #0 sets a wavelength of measurement light, which is transmitted from the measurement light transmitter 35, to a wavelength to be measured (frequency f) (Operations P11 and P12). The setting is implemented by, for example, the control unit 39 of the measurement node #0 controlling an oscillating frequency of a variable wavelength light source included in the measurement light transmitter 35. Note that an example of a variable wavelength light source is a tunable laser diode (TLD).

Measurement light transmitted from the measurement light transmitter 35 is inputted (added) as add light to the add port of the downstream WSS 33A (operation P13) and transmitted from the WSS 33A to the node #1 through the optical transmission line 4A.

At the node #1, one of drop ports of the downstream SPL 32A and one of add ports of the upstream WSS 33B are connected by the loop-back connection 37. With this, light including the measurement light branched at the SPL 32A is looped back to the add port of the WSS 33B at the node #1 (operation P14).

The WSS 33B transmits the light looped back by the loop-back connection 37 to the upstream optical transmission line 4B (node #0) through the post-amp 34B (operation P15).

At the node #0, light including the measurement light looped back at the node #1 is inputted to the SPL 32B through the optical transmission line 4B and the light including the measurement light is dropped to the measurement light receiver 36 by the SPL 32B (operation P16).

The measurement light receiver 36 receives the measurement light dropped from the SPL 32B and measures a network parameter based on the received measurement light (operation P17). This completes measurement of a network parameter for a span between the nodes #0 and #1.

A network parameter for other spans may be measured by changing the node #j that implements loop-back of measurement light. For example, when network parameters for all spans between adjacent nodes #j are measured, a node which implements loop-back (which may be referred to as a "loop-back node") #k (k=any of 2 to n) may be changed sequentially.

In an example of FIG. 4, measurement of a network parameter is repeatedly implemented for different spans while incrementing the node number k by 1 (operations P18 to P25).

For example, at the nodes #1 to #(k−1) except the loop-back node #k, the downstream WSS 33A passes through measurement light so that the measurement light transmitted from the node #0 reaches the loop-back node #k (operation P19).

At the loop-back node #k, the light that is branched by the SPL 32A and includes measurement light is looped back to the add port of the upstream WSS 33B through the loop-back connection 37 (operation P20).

The WSS 33B of the loop-back node #k transmits the light looped back by the loop-back connection 37 to the upstream optical transmission line 4B (node #(k−1)) through the post-amp 34B (operation P21).

The nodes #(k−1) to #1 other than the loop-back node #k passes-through the measurement light at the upstream WSS 33B so that the measurement light looped back at the node #k reaches the measurement node #0 (operation P22).

At the node #0, the light including the measurement light looped back at the node #k is inputted to the SPL 32B through the optical transmission line 4B and the light including the measurement light is dropped to the measurement light receiver 36 at the SPL 32B (operation P23).

The measurement light receiver 36 receives the measurement light dropped from the SPL 32B and measures a network parameter based on the received measurement light (operation P24). This completes the measurement of a network parameter for spans between the node #0 and the node #k. The above operations P19 to P24 are repeatedly implemented by changing the loop-back node number k.

When the measurement for all of the nodes #1 to #n completes, the node #0 may release settings of through connection or loop-back connection of measurement light at all of the nodes #0 to #n (operation P26). The OSC light, which is already described, may be used for the release.

The node #0 may calculate a network parameter at each of the nodes #1 to #n based on the measurement result of the network parameter for each span (operation P27). To change the measurement wavelength (frequency f), the operations P11 to P27 described above may be repeated for each measurement wavelength (operation P28).

Since measurement (observation) of a network parameter of the optical network 1 becomes possible, as described above, the transmission performance of the optical network 1 may be improved or risk may be reduced.

For example, if an observation value is smaller than a design value of a network parameter (stated differently, when there is an enough margin), based on the observation value, a transmission distance or transmission capacity may be increased, a wavelength grid may be changed (the frequency utilization efficiency may be improved through narrowing, for example), or the like. In addition, based on the observation value, a modulation system of signal light may be changed to a more appropriate modulation system (a multivalued degree may be changed, for example), costs or power consumption of the optical network 1 may be reduced by dispensing with deployment of a so-called 3R repeater, or the like.

On the one hand, when a design value and an observation value of a network parameter are same or almost equal (stated differently, when there is no or a little margin), risk may be reduced by optimizing the optical network 1 or risk when a path is changed may be reduced. For example, the ability to understand in advance characteristics of a path to be changed may reduce the possibility that the transmission quality deteriorates accompanying a change of the path or diversify a protection path.

A configuration example of the measurement light transmitter 35 and the measurement light receiver 36 is hereinafter described with reference to FIG. 5 to FIG. 8. Measurement of any of an OSNR, PDL, PMD, and chromatic dispersion (CD) becomes possible, according to a configuration of the measurement light transmitter 35 and the measurement light receiver 36.

[OSNR Measurement]

Figure 5:
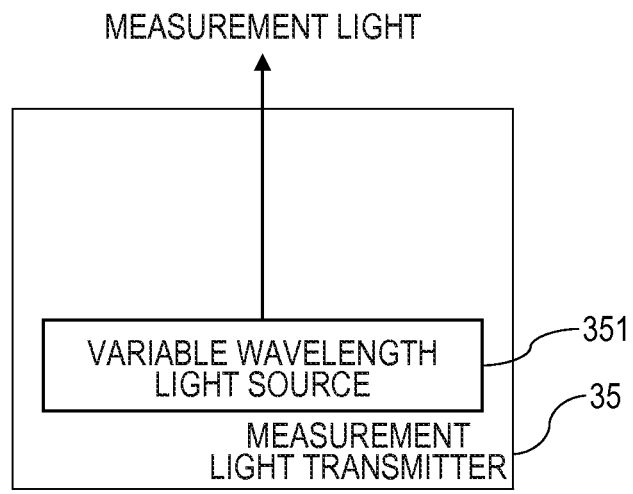
FIG. 5 is a block diagram illustrating a configuration example (case of OSNR measurement) of a measurement light transmitter exemplarily illustrated in FIG. 2 and FIG. 3.

To measure an OSNR, as exemplarily illustrated in FIG. 5, the measurement light transmitter 35 may include a variable wavelength light source (TLD, for example) 351. In addition, if a measurement frequency is not desirable to be changed, the light source 351 may be a fixed wavelength light source. This similarly applies to a configuration of the measurement light transmitter 35 to be described below in FIG. 7, FIG. 9, and FIG. 11.

Figure 6:
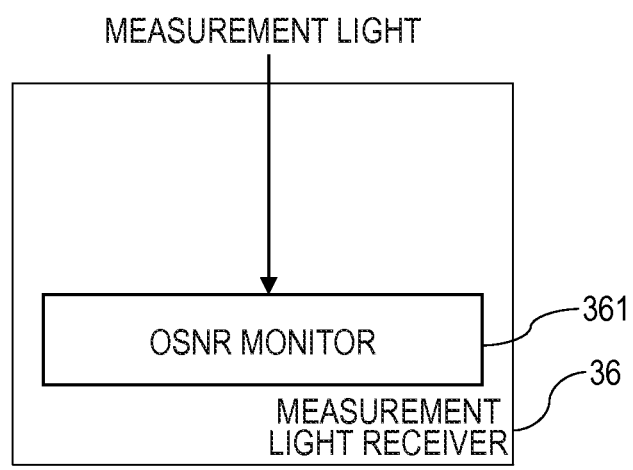
FIG. 6 is a block diagram illustrating configuration example (case of OSNR measurement) of a measurement light receiver exemplarily illustrated in FIG. 2 and FIG. 3.

On the one hand, the measurement light receiver 36 may include an OSNR monitor 361, as exemplarily illustrated in FIG. 6. A configuration or an algorithm which has already been known may be applied to the OSNR monitor 361.

[PDL Measurement]

Figure 7:
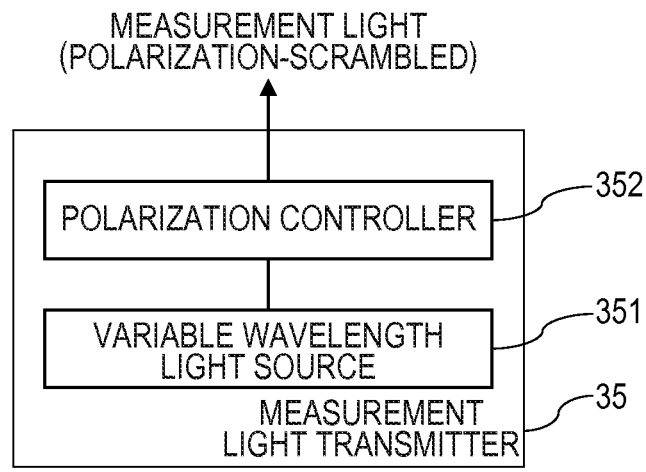
FIG. 7 is a block diagram illustrating a configuration example (case of PDL measurement) of the measurement light transmitter exemplarily illustrated in FIG. 2 and FIG. 3.

When measuring PDL, the measurement light transmitter 35 may include a variable wavelength light source (TDL, for example) 351 and a polarization controller 352, as exemplarily illustrated in FIG. 7. The polarization controller 352 may polarization-scramble measurement light by controlling polarized wave of output light of the variable wavelength light source 351.

Figure 8:
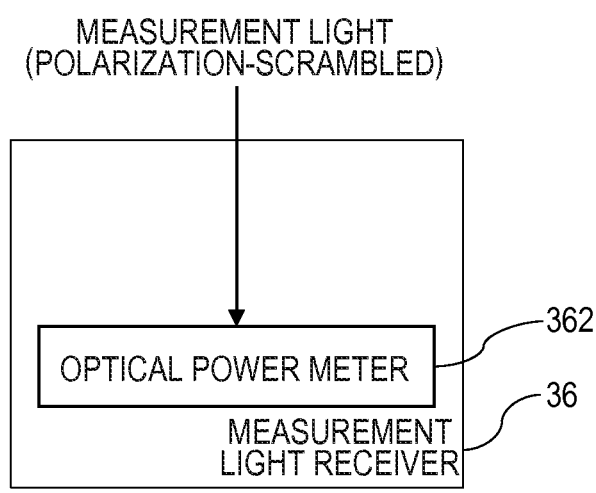
FIG. 8 is a block diagram illustrating a configuration example (case of PDL measurement) of the measurement light receiver exemplarily illustrated in FIG. 2 and FIG. 3.

On the one hand, as exemplarily illustrated in FIG. 8, the measurement light receiver 36 may include an optical power meter 362. The optical power meter 362 may measure power of input (reception) light. The optical power meter 362 of the measurement light receiver 36 measures reception power of the measurement light that is polarization-scrambled by the measurement light transmitter 35. The optical power meter 362 may measure PDL by detecting a difference between a maximum value and a minimum value of power according to the polarization scramble. The detection method may be referred to as a Min-Max method.

[PMD Measurement]

Figure 9:
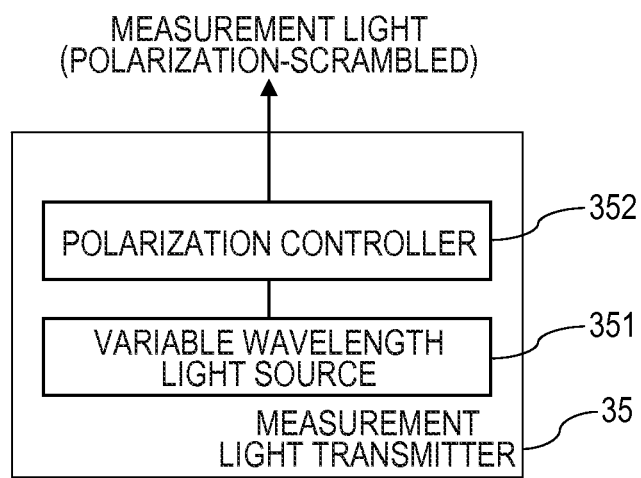
FIG. 9 is a block diagram illustrating a configuration example (case of PMD measurement) of the measurement light transmitter exemplarily illustrated in FIG. 2 and FIG. 3.

When measuring PMD, as exemplarily illustrated in FIG. 9, the measurement light transmitter 35 may include a variable wavelength light source 351 and a polarization controller 352, similar to the measurement light transmitter 35 in FIG. 7.

Figure 10:
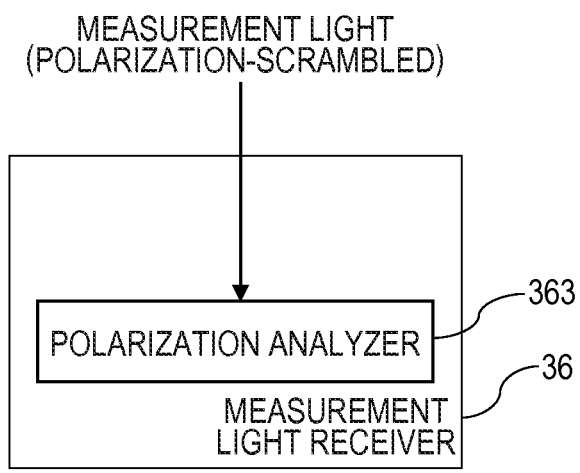
FIG. 10 is a block diagram illustrating a configuration example (case of PMD measurement) of the measurement light receiver exemplarily illustrated in FIG. 2 and FIG. 3.

On the one hand, as exemplarily illustrated in FIG. 10, the measurement light receiver 36 may include a polarization analyzer 363. The polarization analyzer 363 may measure PMD by analyzing a polarized wave state of the measurement light which is polarization-scrambled by the measurement light transmitter 35.

Exemplarily, a Jones Matrix Eigenanalysis method (JME method), a Poincare Spheremethod (PS method), a Muller Matrix Method (MMM) or the like may be applied to an analytical algorithm at the polarization analyzer 363.

[CD Measurement]

To measure chromatic dispersion (CD), a modulation phase shift method (MPS method), a swept wavelength interferometry method (SWI method), or the like may be applied.

Figure 11:
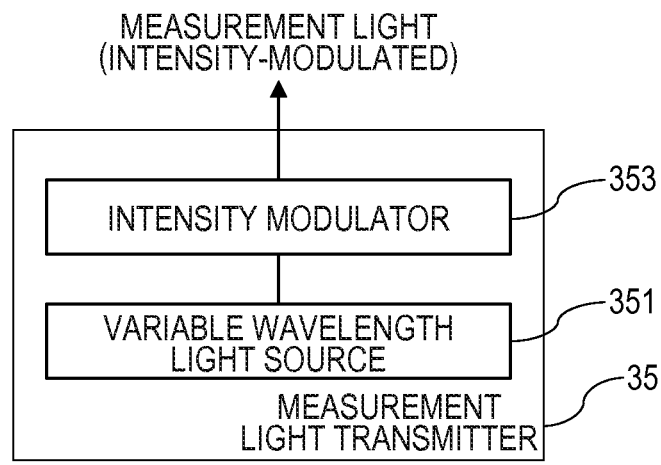
FIG. 11 is a block diagram illustrating a configuration example (case of CD measurement) of the measurement light transmitter exemplarily illustrated in FIG. 2 and FIG. 3.
Figure 12:
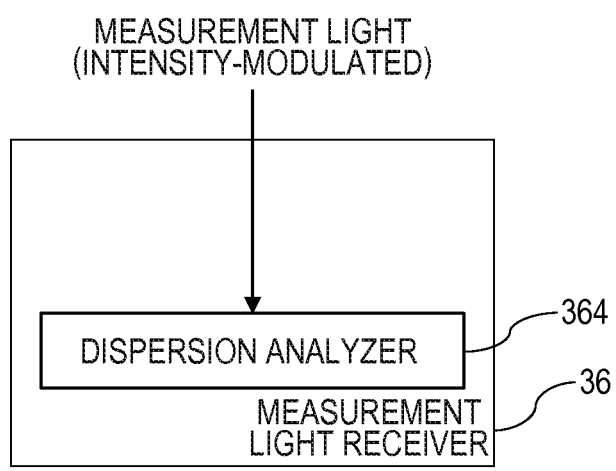
FIG. 12 is a block diagram illustrating a configuration example (case of CD measurement) of the measurement light receiver exemplarily illustrated in FIG. 2 and FIG. 3.

When the MPS method is applied, the measurement light transmitter 35 may include the variable wavelength light source (TLD, for example) 351 and an intensity modulator 353, as exemplarily illustrated in FIG. 11. On the one hand, the measurement light receiver 36 may include a dispersion analyzer 364, as exemplarily illustrated in FIG. 12.

In the MPS method, the intensity modulator 353 provides output light of the variable wavelength light source 351 with intensity modulation and the dispersion analyzer 364 analyzes wavelength dependence of a phase of the received measurement light, which thereby makes it possible to calculate CD.

Note that configurations exemplarily illustrated in FIG. 5 to FIG. 12 may be such combined that any two or more of the OSNR, the PDL, the PMD, and the CD may be measured in a composite manner.

[Method for Measuring an OSNR]

A method for measuring an OSNR is described hereinafter with reference to FIG. 13 to FIG. 18.

[Measurement of an OSNR Between Nodes #0 and #1]

Figure 13:
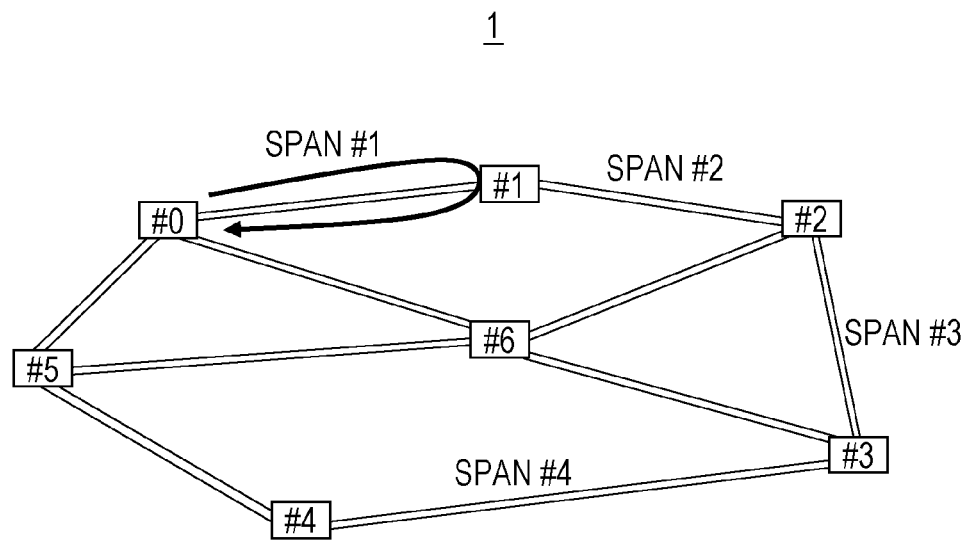
FIG. 13 is a view describing a method for measuring a network parameter in the optical transmission system exemplarily illustrated in FIG. 1 to FIG. 3.
Figure 16:
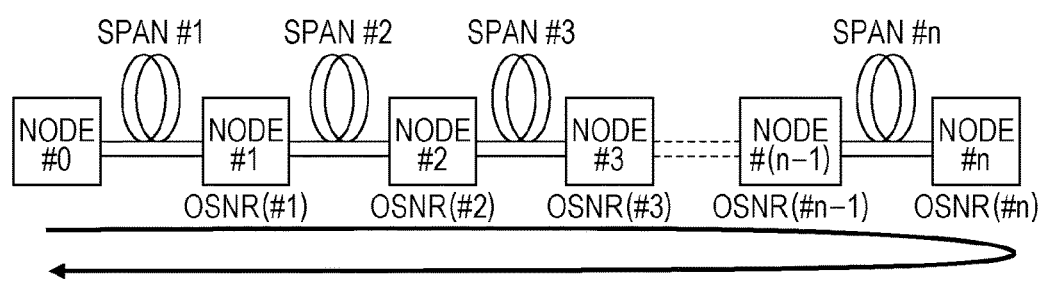
FIG. 16 is a view for generalizing and describing a method for measuring an OSNR in the optical transmission system exemplarily illustrated in FIG. 1 to FIG. 3.
Figure 17:
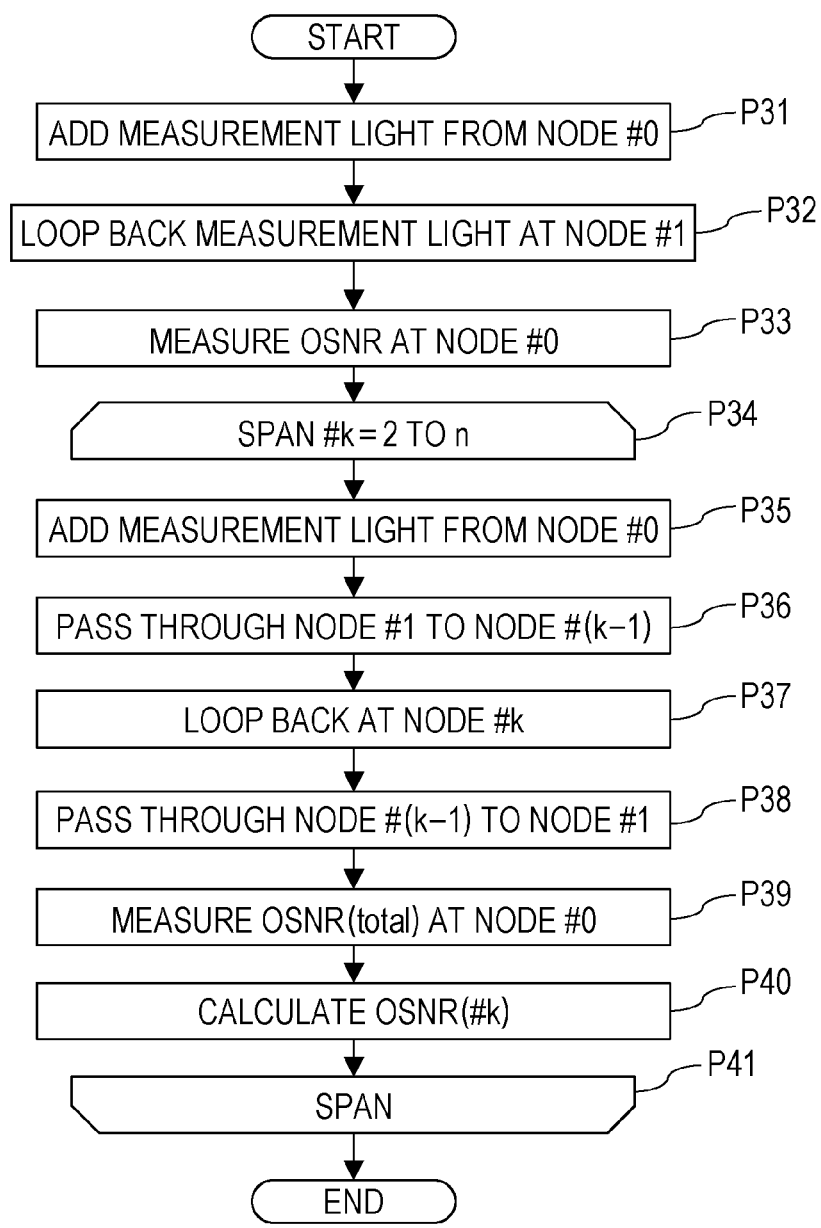
FIG. 17 is a flow chart for generalizing and describing a method for measuring an OSNR in the optical transmission system exemplarily illustrated in FIG. 1 to FIG. 3.

To measure an OSNR(#1) at a node #1 (for a span #1: see FIG. 16) between nodes #0 and #1, as exemplarily illustrated in FIG. 13, measurement light is added from the measurement light transmitter 35 of the node #0 to light to be transmitted to the node #1 (operation P31 in FIG. 17).

The node #1 loops back the received measurement light to the upstream and transmits the measurement light to the node #0 (operation P32 in FIG. 17).

The node #0 receives at the measurement light receiver 36 the measurement light looped back at the node #1. The OSNR monitor 361 of the measurement light receiver 36 measures a total OSNR(total) of the span #1 based on the received measurement light (operation P33 in FIG. 17).

Here, if it is assumed that an OSNR in the downstream and an OSNR in the upstream of the span #1 are equivalent, the OSNR(#1) at the node #1 for the span #1 may be determined with the following mathematical expression 1, based on the measured OSNR(total):

$$OSNR(\#1) = \frac{2}{\frac{1}{OSNR(total)}} \quad \text{(Mathematical expression 1)}$$

[Measurement of an OSNR(#2) Between the Nodes #1 and #2]

Figure 14:
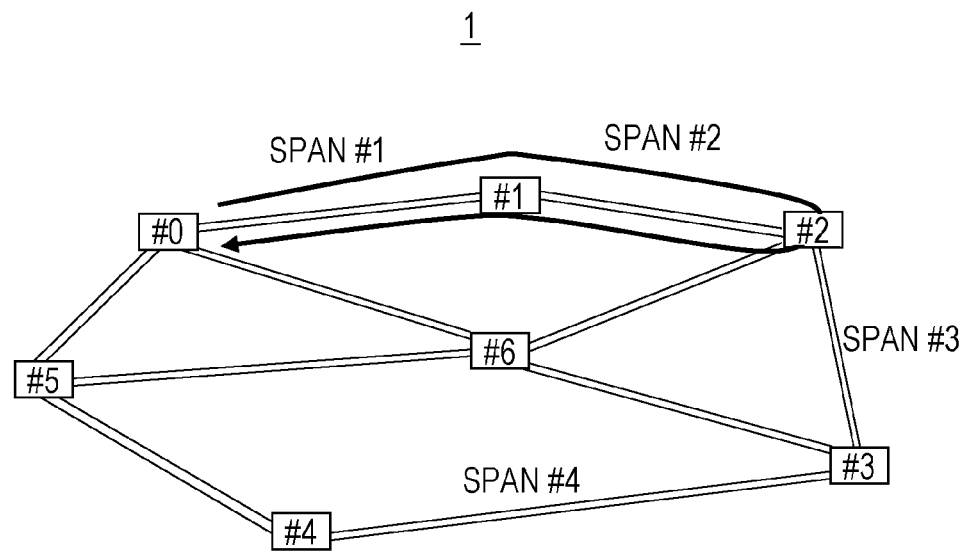
FIG. 14 is a view describing a method for measuring a network parameter in the optical transmission system exemplarily illustrated in FIG. 1 to FIG. 3.

Then, to measure an OSNR(#2) at the node #2 (for a span #2: see FIG. 16) between the nodes #1 and #2, as exemplarily illustrated in FIG. 14, measurement light is added from the measurement light transmitter 35 of the node #0 to light to be transmitted to the node #1 (operations P34 and P35 in FIG. 17).

The node #1 passes-through the measurement light received from the node #0 to the downstream node #2 (operation P36 in FIG. 17).

The node #2 loops back the measurement light received from the node #1 to the upstream and transmits the measurement light to the node #1 (operation P37 in FIG. 17).

The node #1 passes-through the measurement light received from the node #2 to the node #0 (operation P38 in FIG. 17).

The node #0 receives at the measurement light receiver 36 the measurement light which is looped back at the node #2 and is passed-through the node 1. The OSNR monitor 361 of the measurement light receiver 36 measures a total OSNR (total) of the spans #1 and #2 based on the received measurement light (operation P39 in FIG. 17).

Here, it is assumed that the OSNR in the downstream and the OSNR in the upstream for the spans #1 and #2 are equivalent. In this case, the OSNR(#2) at the node #2 for the span #2 may be determined with the following mathematical expression 2 based on the measured OSNR(total) and the OSNR(#1) for the span #1 (operation P40 in FIG. 17).

$$OSNR(\#2) = \frac{2}{\frac{1}{OSNR(total)} - \frac{2}{OSNR(\#1)}} \quad \text{(Mathematical expression 2)}$$

[Measurement of an OSNR(#3) Between the Nodes #2 and #3]

Figure 15:
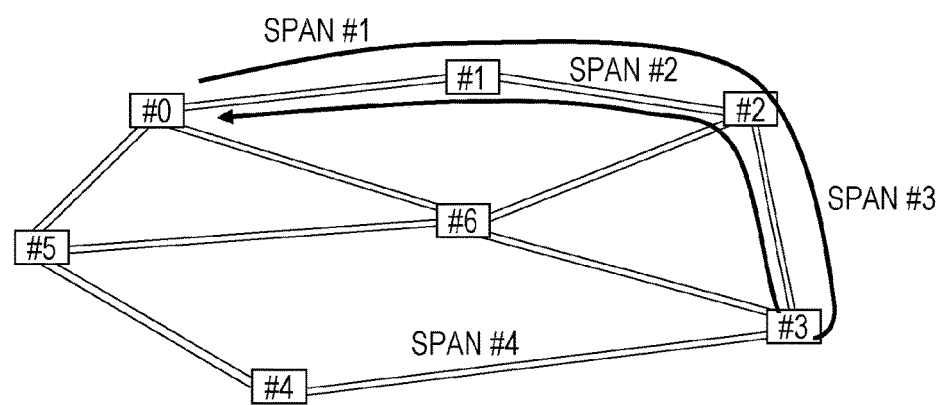
FIG. 15 is a view for describing a method for measuring a network parameter in the optical transmission system exemplarily illustrated in FIG. 1 to FIG. 3.

Then, in order to measure an OSNR(#3) at the node #3 (for a span #3: see FIG. 16) between the nodes #2 and #3, as exemplarily illustrated in FIG. 15, measurement light is added from the measurement light transmitter 35 of the node #0 to light to be transmitted to the node #1 (operations P34 and P35 in FIG. 17).

The node #1 passes-through the measurement light received from the node #0 to the downstream node #2, and the node #2 passes-through the measurement light received from the node #1 to the downstream node #3 (operation P36 in FIG. 17).

The node #3 loops back the measurement light received from the node #2 to the upstream (operation P37 in FIG. 17).

The node #2 passes-through the measurement light received from the node #3 to the node #1 and similarly, the node #1 passes-through the measurement light received from the node #2 to the node #0 (operation P38 in FIG. 17).

The node #0 receives at the measurement light receiver 36 the measurement light which is looped back at the node #3 and is passed-through the nodes #2 and #1, respectively. The OSNR monitor 361 of the measurement light receiver 36 measures a total OSNR(total) for the spans #1 to #3 based on the received measurement light (operation P39 in FIG. 17).

Here, it is assumed that the OSNR in the downstream and the OSNR in the upstream for the spans #1 to #3 are equivalent. In this case, the OSNR(#3) at the node #3 for the span #3 may be determined with the following mathematical expression 3 based on the measured OSNR(total), and the OSNR(#1) for the span #1 and the OSNR(#2) for the span #2 (operation P40 in FIG. 17).

$$OSNR(\#3) = \frac{2}{\frac{1}{OSNR(total)} - \frac{2}{OSNR(\#1)} - \frac{2}{OSNR(\#2)}} \quad \text{(Mathematical expression 3)}$$

[Generalization of a Method for Measuring an OSNR]

As exemplarily illustrated in FIG. 16 and FIG. 17, an OSNR(#k) at the node #k for a span #k between the node #(k−1) and the node #k may be measured by repeating measurement while sequentially changing the loop-back node #k in a range of k=1 to n.

For example, as exemplarily illustrated in FIG. 13, the OSNR(#1) between the nodes #0 and #1 (span #1) is first measured (operations P31 to P33 in FIG. 17). Then, the OSNR(#k) for the span #k is repeatedly measured by sequentially changing a value of k in a range from 2 to n (operations P34 to P41 in FIG. 17).

For example, the node #0 adds the measurement light from the measurement light transmitter 35 to the light to be transferred to the node #1 (operation P35 in FIG. 17).

The nodes #1 to #(k−1) pass-through the measurement light received from the node #0 to the downstream node #k (operation P36 in FIG. 17).

The node #k loops back the measurement light received from the node #(k−1) to the upstream (operation P37 in FIG. 17).

The nodes #(k−1) to #1 pass-through the measurement light received from the node #k to the node #0 (operation P38 in FIG. 17).

The node #0 receives at the measurement light receiver 36 the measurement light which is looped back at the node #2 and is passed-through the nodes #(k−1) to #1. The OSNR monitor 361 of the measurement light receiver 36 measures a total OSNR(total) for the spans #1 to #k based on the received measurement light (operation P39 in FIG. 17).

Here, it is assumed that the OSNR in the downstream and the OSNR in the upstream for the spans #1 to #k are equivalent. In this case, the OSNR(#k) at the node #k for the span #k may be determined with the following mathematical expression 4 based on the measured OSNR(total) and the OSNR(#1) to the OSNR(#k−1) for the spans #1 to #k (operation P40 in FIG. 17).

$$OSNR(\#k) = \cfrac{2}{\cfrac{1}{OSNR(\text{total})} - \sum_{k=1}^{n} \cfrac{2}{OSNR(\#k-1)}} \quad \text{(Mathematical expression 4)}$$

Note that the OSNR(#k) for the span k may be determined with the above mathematical expression 4 even when nodes with different configurations are present in the nodes #1 to #n. For example, even when a node that has an in line amplifier (ILA) but has no OADM function is present in the nodes #1 to #n, the OSNR(#k) for the span #k may be determined with the above mathematical expression 4.

A received OSNR (antilogarithm) at a node #m in a path from a certain node #k to other node #m (m=any from 1 to n and m>k) may be determined with the following mathematical expression 5 based on the OSNR(#k) at each measured node #k.

$$OSNR_{k \to m} = \cfrac{1}{\sum_{k+1}^{m} \cfrac{1}{OSNR(\#k)}} \quad \text{(Mathematical expression 5)}$$

Figure 18:
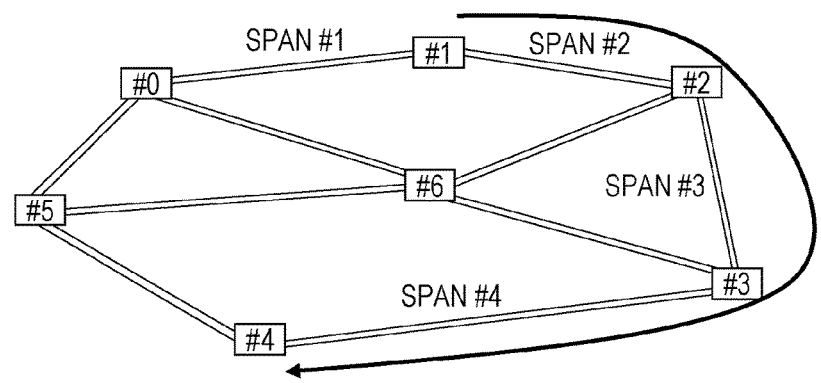
FIG. 18 is a view for describing a method for determining a reception characteristic at a node #4 in a path from a node #1 to the node #4 in the optical transmission system exemplarily illustrated in FIG. 1 to FIG. 3.

For example, as illustrated in FIG. 18, a received OSNR at the node #4 on a path from the node 1 to the node #4 by way of the nodes #2 and #3 may be determined with the following mathematical expression 6.

$$OSNR_{1 \to 4} = \cfrac{1}{\cfrac{1}{OSNR(\#2)} + \cfrac{1}{OSNR(\#3)} + \cfrac{1}{OSNR(\#4)}} \quad \text{(Mathematical expression 6)}$$

[Method for Measuring PDL]

A method for measuring PDL is described hereinafter.

(Measurement of PDL(#1) Between Nodes #0 and #1)

To measure PDL(#1) at a node #1 (for a span #1: see FIG. 19) between nodes #0 and #1, the polarization controller 352 polarization-scrambles measurement light at the measurement light transmitter 35 of the node #0. The measurement light which is polarization-scrambled is added to light to be transmitted to the node #1 (operation P51 in FIG. 20).

Figure 20:
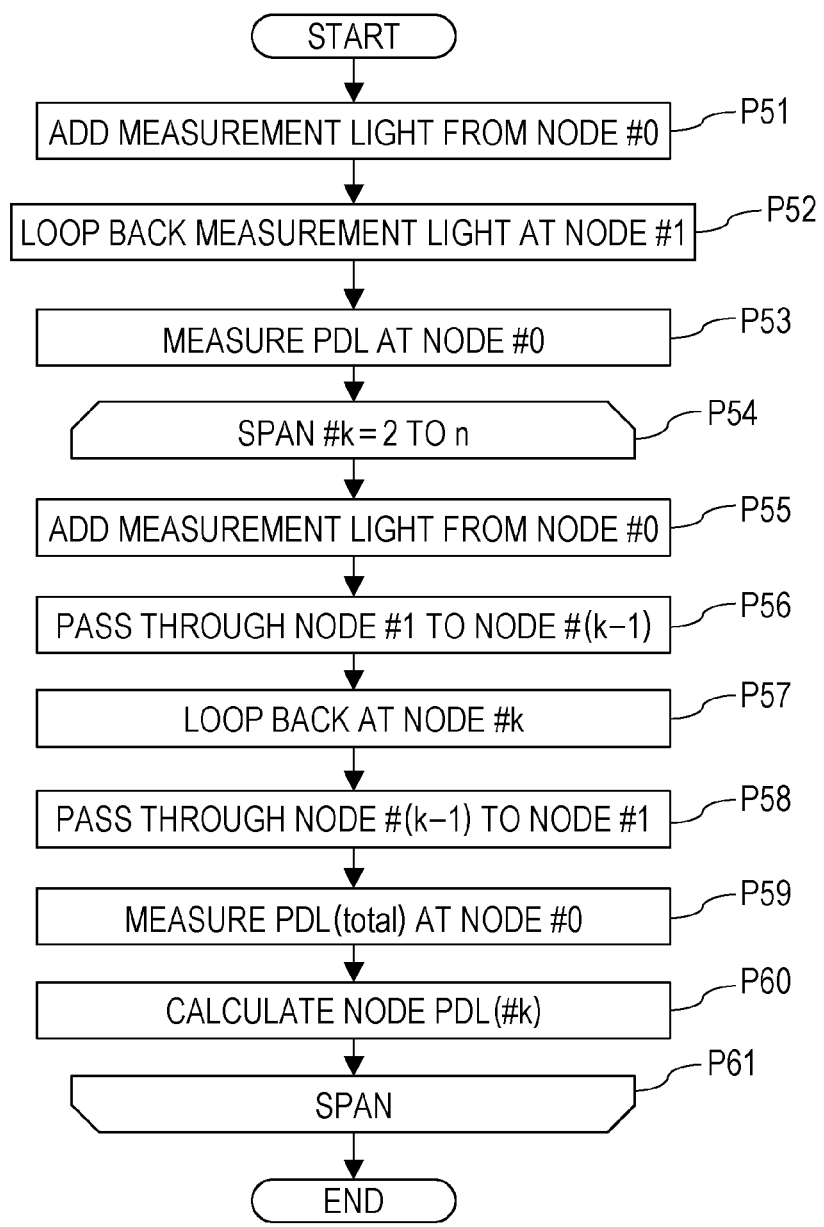
FIG. 20 is a flow chart for generalizing and describing a method for measuring PDL in the optical transmission system exemplarily illustrated in FIG. 1 to FIG. 3.

As exemplarily illustrated in FIG. 13, the node #1 loops back the received measurement light to the upstream and transmits the measurement light to the node #0 (operation P52 in FIG. 20).

The node #0 receives at the measurement light receiver 36 the measurement light which is looped back at the node #1. The optical power meter 362 of the measurement light receiver 36 measures total PDL(total) for the span #1 with the Min-Max method based on power variations in the received measurement light (operation P53 in FIG. 20).

Here, if it is assumed that downstream PDL and upstream PDL are equivalent for the span #1, PDL(#1) at the node #1 for the span #1 may be determined with the following mathematical expression 7 based on the measured PDL (total):

$$PDL(\#1) = \sqrt{\cfrac{PDL(\text{total})^2}{2}} \quad \text{(Mathematical expression 7)}$$

[Measurement of PDL(#2) Between Nodes #1 and #2]

Then, to measure PDL(#2) at the node #2 (for a span #2: see FIG. 19) between the nodes #1 and #2, polarization-scrambled measurement light is added from the measurement light transmitter 35 of the node #0 to light to be transmitted to the node #1 (operations P54 and P55 in FIG. 20).

As exemplarily illustrated in FIG. 14, the node #1 passes-through the measurement light received from the node #0 to the downstream node #2 (operation P56 in FIG. 20).

As exemplarily illustrated in FIG. 14, the node #2 loops back the measurement light received from the node #1 to the upstream and transmits the measurement light to the node #1 (operation P57 in FIG. 20).

As exemplarily illustrated in FIG. 14, the node #1 passes-through the measurement light received from the node #2 to the node #0 (operation P58 in FIG. 20).

The node #0 receives at the measurement light receiver 36 the measurement light which is looped back at the node #2 and is passed-through the node #1. The optical power meter 362 of the measurement light receiver 36 measures total PDL(total) for the spans #1 and #2 with the Min-Max method, for example, based on power variations in the received measurement light (operation P59 in FIG. 20).

Here, it is assumed that the downstream PDL and the upstream PDL for the spans #1 and #2 are equivalent. In this case, the PDL(#2) at the node #2 for the span #2 may be determined with the following mathematical expression 8 based on the measured PDL(total) and the PDL(#1) for the span #1 (operation P60 in FIG. 20).

$$PDL(\#2) = \sqrt{\cfrac{PDL(\text{total})^2 - 2 \times PDL(\#1)^2}{2}} \quad \text{(Mathematical expression 8)}$$

[Measurement of PDL(#3) Between Nodes #2 and #3]

Then, to measure PDL(#3) at the node #3 (for a span #3: see FIG. 19) between the nodes #2 and #3, measurement light which is polarization-scrambled is added from the measurement light transmitter 35 of the node #0 to light to be transmitted to the node #1 (operations P54 and P55 in FIG. 20).

As exemplarily illustrated in FIG. 15, the node 1 passes-through the measurement light received from the node #0 to the downstream node #2 and the node #2 passes-through the measurement light received from the node #1 to the downstream node #3 (operation P56 in FIG. 20).

As exemplarily illustrated in FIG. 15, the node #3 loops back the measurement light received from the node #2 to the upstream (operation P57 in FIG. 20).

The node 2 passes-through the measurement light received from the node #3 to the node #1, and similarly, the node 1 passes-through the measurement light received from the node #2 to the node #0 (operation P58 in FIG. 20).

The node #0 receives at the measurement light receiver 36 the measurement light which is looped back at the node #3 and is passed-through the nodes #2 and #1, respectively. The optical power meter 362 of the measurement light receiver 36 measures total PDL(total) for the spans #1 to #3 with the Min-Max method, for example, based on power variations in the received measurement light (operation P59 in FIG. 20).

Here, it is assumed that the downstream PDL and the upstream PDL for the spans #1 to #3 are equivalent. In this case, the PDL(#3) at the node #3 for the span #3 may be determined with the following expression 9, based on the measured PDL(total), and the PDL(#1) for the span #1 and the PDL(#2) for the span #2 (operation P60 in FIG. 20).

$$PDL(\#3) = \sqrt{\frac{PDL(\text{total})^2 - 2 \times PDL(\#1)^2 - 2 \times PDL(\#2)^2}{2}}$$

(Mathematical expression 9)

[Generalization of a Method for Measuring PDL]

Figure 19:
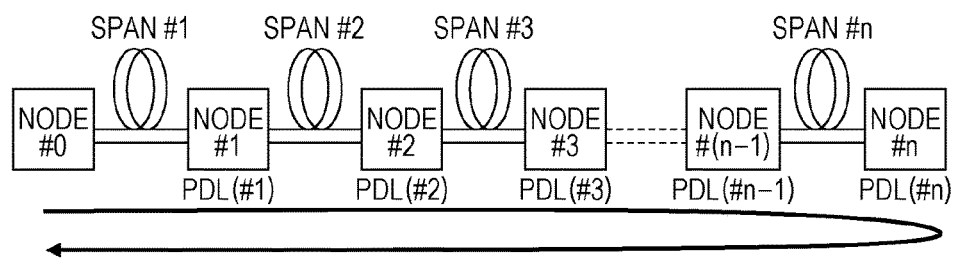
FIG. 19 is a view for generalizing and describing a method for measuring PDL in the optical transmission system exemplarily illustrated in FIG. 1 to FIG. 3.

As exemplarily illustrated in FIG. 19 and FIG. 20, PDL (#k) at the node #k for the span #k between the node#(k−1) and the node #k may be measured by repeating measurement while sequentially changing the loop-back node #k in a range of k=1 to n.

For example, as exemplarily illustrated in FIG. 13, the PDL(#1) between the nodes #0 and #1 (span #1) is first measured (operations P51 to P53 in FIG. 20). Then, PDL (#k) for the span #k is repeatedly measured by sequentially changing a value of k in a range of 2 to n (operations P54 to P61 in FIG. 20).

For example, the node #0 adds the measurement light, which is polarization-scrambled, from the measurement light transmitter 35 to light to be transmitted to the node #1 (operation P55 in FIG. 20).

The nodes #1 to #(k−1) pass-through the measurement light received from the node #0, to the downstream node #k (operation P56 in FIG. 20).

The node #k loops back the measurement light received from the node #(k−1) to the upstream (operation P57 in FIG. 20).

The nodes #(k−1) to #1 pass-through the measurement light received from the node #k, to the node #0 (operation P58 in FIG. 20).

The node #0 receives at the measurement light receiver 36 the measurement light which is looped back at the node #2 and is passed-through the nodes #(k−1) to #1. The optical power meter 362 of the measurement light receiver 36 measures total PDL(total) for the spans #1 to #k with the Min-Max method, for example, based on power variations in the received measurement light (operation P59 in FIG. 20).

Here, it is assumed that the downstream PDL and the upstream PDL for the spans #1 to #k are equivalent. In this case, the PDL(#k) at the node #k for the span #k may be determined with the following mathematical expression 10, based on the measured PDL(total), and the PDL(#1) and the PDL(#k−1) for the spans #1 to #k (operation P60 in FIG. 20).

$$PDL(\#k) = \sqrt{\frac{PDL(\text{total})^2 - 2 \times \sum_{i=1}^{n} PDL(\#k)^2}{2}}$$

(Mathematical expression 10)

Note that the PDL(#k) for the span #k may be determined with the above mathematical expression 10 even when nodes with different configurations are present in the nodes #1 to #n. For example, even when a node that has an ILA but has no OADM function is present in the nodes #1 to #n, the PDL(#k) for the span #k may be determined with the above mathematical expression 10.

Total PDL on a path from a certain node #k to a node #m (m=any of 1 to n and m>k) may be determined with the following mathematical expression 11, based on PDL(#k) at each measured node #:

$$\text{Total } PDL_{k \to m} = \sqrt{\sum_{k+1}^{m} PDL(\#k)^2}$$

(Mathematical expression 11)

For example, as illustrated in FIG. 18, PDL at the node #4 on a path from the node #1 to the node #4 by way of the node #2 and the node #3 may be determined with the following mathematical expression 12: (Mathematical expression 12)

$$\text{Total PDL}_{1 \to 4} = \sqrt{PDL(\#2)^2 + PDL(\#3)^2 + PDL(\#4)^2}$$

[Method for Measuring PMD]

Then, a method for measuring PMD is described hereinafter.

[Method for Measuring PMD(#1) Between Nodes #0 and #1]

To measure PMD(#1) at the node #1 (for a span #1: see FIG. 21) between the nodes #0 and #1, the polarization controller 352 polarization-scrambles measurement light at the measurement light transmitter 35 of the node #0. The polarization-scrambled measurement light is added to light to be transmitted to the node #1 (operation P71 in FIG. 22).

Figure 22:
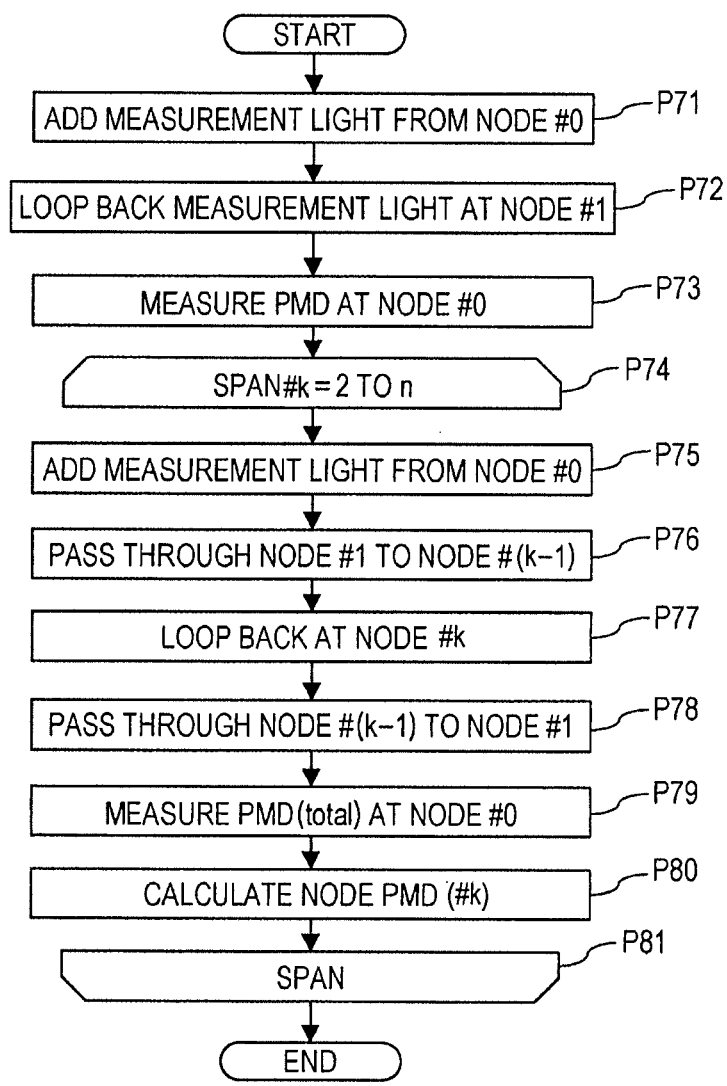
FIG. 22 is a flow chart for generalizing and describing a method for measuring PMD in the optical transmission system exemplarily illustrated in FIG. 1 to FIG. 3.

As exemplarily illustrated in FIG. 13, the node #1 loops back the received measurement light to the upstream and transmits the measurement light to the node #0 (operation P72 in FIG. 22).

The node #0 receives at the measurement light receiver 36 the measurement light which is looped back at the node #1. The polarization analyzer 363 of the measurement light receiver 36 measures total PMD(total) for the span #1 by analyzing a polarized wave state of the received measurement light (operation P73 in FIG. 22).

Here, if it is assumed that the downstream PDL and the upstream PDL for the span #1 are equivalent, the PMD(#1) at the node #1 for the span #1 may be determined with the following mathematical expression 13 based on the measured PMD(total):

$$PMD(\#1) = \sqrt{\frac{PMD(\text{total})^2}{2}}$$

(Mathematical expression 13)

[Measurement of PMD(#2) Between Nodes #1 and #2]

Then, to measure PMD(#2) at the node #2 (for a span #2: see FIG. 21) between the nodes #1 and #2, the measurement light, which is polarization-scrambled, is added from the measurement light transmitter 35 of the node #0 to light to be transmitted to the node #1 (operations P74 and P75 in FIG. 22).

As exemplarily illustrated in FIG. 14, the node #1 passes-through the measurement light received from the node #0, to the downstream node #2 (operation P76 in FIG. 22).

As exemplarily illustrated in FIG. 14, the node #2 loops back the measurement light received from the node #1 to the upstream and transmits the measurement light to the node #1 (operation P77 in FIG. 22).

As exemplarily illustrated in FIG. 14, the node #1 passes-through the measurement light received from the node #2, to the node #0 (operation P78 in FIG. 22).

The node #0 receives at the measurement light receiver 36 the measurement light which is looped back at the node #2 and is passed-through the node #1. The polarization analyzer 363 of the measurement light receiver 36 analyzes a polarized wave state of the received measurement light and measures total PMD(total) for the spans #1 and #2 (operation P79 in FIG. 22).

Here, it is assumed that the downstream PMD and the upstream PMD for the spans #1 and #2 are equivalent. In this case, PMD(#2) at the node #2 for the span #2 may be determined with the following mathematical expression 14, based on the measured PMD(total) and the PMD(#1) for the span #1 (operation P80 in FIG. 22):

$$PMD(\#2) = \sqrt{\frac{PMD(total)^2 - 2 \times PMD(\#1)^2}{2}}$$ (Mathematical expression 14)

[Measurement of PMD(#3) Between Nodes #2 and #3]

Then, to measure PMD(#3) at the node #3 (for a span #3: see FIG. 21) between the nodes #2 and #3, the measurement light, which is polarization scrambled, is added from the measurement light transmitter 35 of the node #0 to light to be transmitted to the node #1 (operations P74 and P75 in FIG. 22).

As exemplarily illustrated in FIG. 15, the node #1 passes-through the measurement light received from the node #0, to the node #2 and the node #2 passes-through the measurement light received from the node #1, to the node #3 (operation P76 in FIG. 22).

As exemplarily illustrated in FIG. 15, the node #3 loops back the measurement light received from the node #2, to the upstream (operation P77 in FIG. 22).

The node #2 passes-through the measurement light received from the node #3, to the node #1 and similarly, the node #1 passes-through the measurement light received from the node #2, to the node #0 (operation P78 in FIG. 22).

The node #0 receives at the measurement light receiver 36 the measurement light which is looped back at the node #3 and is passed-through the nodes 2 and #1, respectively. The polarization analyzer 363 of the measurement light receiver 36 analyzes a polarized wave state of the received measurement light and measures total PMD(total) for the spans #1 to #3 (operation P79 in FIG. 22).

Here, it is assumed that the downstream PMD and the upstream PMD for the spans #1 to #3 are equivalent. In this case, the PMD(#3) at the node #3 for the span #3 may be determined with the following mathematical expression 15, based on the measured PMD(total), and the PMD(#1) for the span #1 and the PMD(#2) for the span #2 (operation P80 in FIG. 22).

$$PMD(\#3) = \sqrt{\frac{PMD(total)^2 - 2 \times PMD(\#1)^2 - 2 \times PMD(\#2)^2}{2}}$$ (Mathematical expression 15)

[Generalization of a Method for Measuring PMD]

Figure 21:
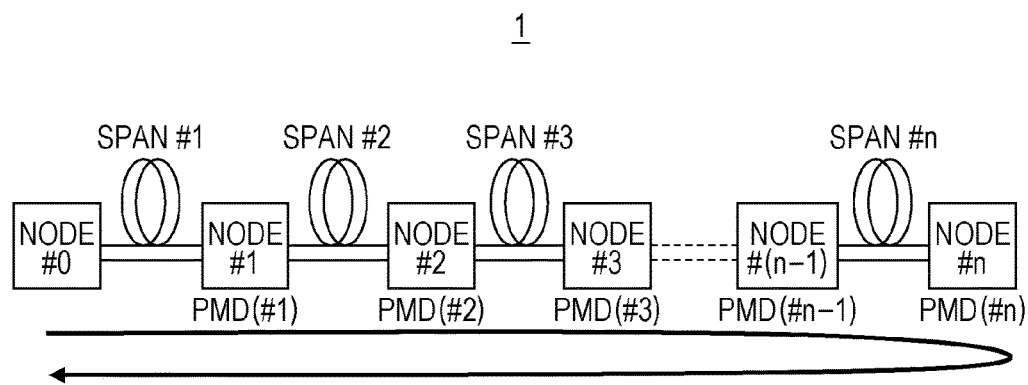
FIG. 21 is a view for generalizing and describing a method for measuring PMD in the optical transmission system exemplarily illustrated in FIG. 1 to FIG. 3.

As exemplarily illustrated in FIG. 21 and FIG. 22, PMD (#k) at the node #k for the span #k between the node #(k−1) and the node #k may be measured by repeating measurement while sequentially changing the loop-back node #k in a range of k=1 to n.

For example, as exemplarily illustrated in FIG. 13, PDL between the nodes #0 and #1 is first measured (operations P71 to P73 in FIG. 22). Then, PMD(#k) is repeatedly measured by sequentially changing a value of k in a range of 2 to n (operations P74 to P81 in FIG. 22).

For example, the node #0 adds the measurement light, which is polarization-scrambled, from the measurement light transmitter 35 to light to be transmitted to the node #1 (operation P75 in FIG. 22).

The nodes #1 to #(k−1) pass-through the measurement light received from the node #0, to the downstream node #k (operation P76 in FIG. 22).

The node #k loops back the measurement light received from the node #(k−1) to the upstream (operation P77 in FIG. 22).

The nodes #(k−1) to #1 pass-through the measurement light received from the node #k, to the node #0 (operation P78 in FIG. 22).

The node #0 receives at the measurement light receiver 36 the measurement light which is looped back at the node #2 and is passed-through the nodes #(k−1) to #1. The polarization analyzer 363 of the measurement light receiver 36 analyzes a polarized wave state of the received measurement light and measures total PMD(total) for the spans #1 to #k (operation P79 in FIG. 22).

Here, it is assumed that the downstream PMD and the upstream PMD for the spans #1 to #k are equivalent. In this case, the PMD(#k) at the node #k for the span #k may be determined with the following mathematical expression 16, based on the measured PMD(total) and the PMD(#1) to PMD(#k−1) for the spans #1 to #k (operation P80 in FIG. 22).

$$PMD(\#k) = \sqrt{\frac{PMD(total)^2 - 2 \times \sum_{k=1}^{n} PMD(\#k)^2}{2}}$$ (Mathematical expression 16)

Note that the PMD(#k) for the span #k may be determined with the above mathematical expression 16 even when nodes with different configurations are present in the nodes #1 to #n. For example, even when a node that has an ILA but has no OADM function is present in the nodes #1 to #n, the PMD(#k) for the span #k may be determined with the above mathematical expression 16.

Total PMD on a path from a certain node #k to other node #m (m=any from 1 to n and m>k) may be determined with the following mathematical expression 17, based on the PMD(#k) at each measured node #k.

$$\text{Total } PMD_{k \to m} = \sqrt{\sum_{k+1}^{m} PMD(\#k)^2}$$ (Mathematical expression 17)

For example, as illustrated in FIG. 18, PMD at the node # on a path from the node #1 to the node #4 by way of the node #2 and the node #3 may be determined with the following mathematical expression 18: (Mathematical expression 18)

$$PMD_{1 \to 4} = \sqrt{PMD(\#2)^2 + PMD(\#3)^2 + PMD(\#4)^2}$$

[Method for Measuring CD]

A method for measuring chromatic dispersion (CD) is described hereinafter.

[Measurement of CD Between Nodes #0 and #1]

To measure CD(#1) at the node #1 (for a span #1: see FIG. 23) between the nodes #0 and #1, measurement light is intensity-modulated by the intensity modulator 353 in the measurement light transmitter 35 of the node #0. The intensity-modulated measurement light is added to light to be transmitted to the node #1 (operation P91 in FIG. 24).

Figure 24:
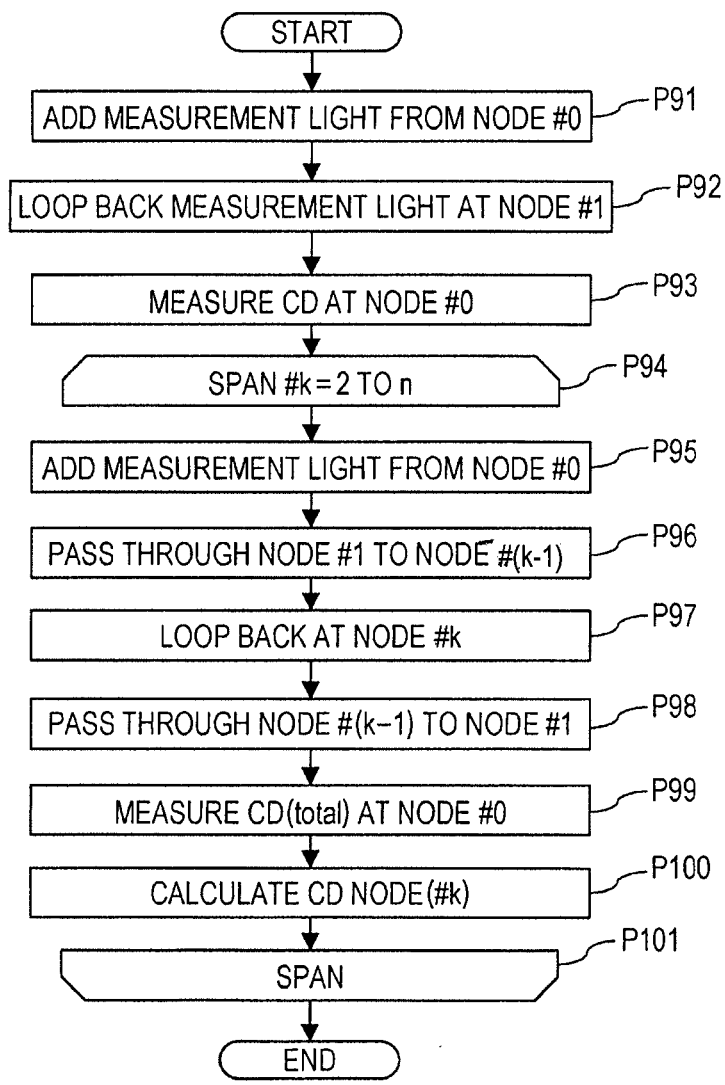
FIG. 24 is a flow chart for generalizing and describing a method for measuring CD in the optical transmission system exemplarily illustrated in FIG. 1 to FIG. 3.

As exemplarily illustrated in FIG. 13, the node #1 loops back the received measurement light to the upstream and transmits the measurement light to the node #0 (operation P92 in FIG. 24).

The node #0 receives at the measurement light receiver 36 the measurement light which is looped back at the node #1. The dispersion analyzer 364 of the measurement light receiver 36 measures total CD(total) for the span #1 by analyzing wavelength dependence on a phase of the received measurement light (operation P93 in FIG. 24).

Here, if it is assumed that the downstream CD and the upstream CD are equivalent for the span #1, the CD(#1) at the node #1 for the span #1 may be determined with the following mathematical expression 19, based on the measured CD(total):

$$CD(\#1) = \frac{CD(\text{total})}{2} \quad \text{(Mathematical expression 19)}$$

[Measurement of CD(#2) Between Nodes #1 and #2]

Then, to measure CD(#2) at the node #2 (for a span #2: see FIG. 23) between the nodes #1 and #2, the intensity-modulated measurement light is added from the measurement light transmitter 35 of the node #0 to light to be transmitted to the node #1 (operations P94 and P95 in FIG. 24).

As exemplarily illustrated in FIG. 14, the node #1 passes-through the measurement light received from the node #0, to the downstream node #2 (operation P96 in FIG. 24).

As exemplarily illustrated in FIG. 14, the node #2 loops back the measurement light received from the node #1 to the upstream and transmits the measurement light to the node #1 (operation P97 in FIG. 24).

As exemplarily illustrated in FIG. 14, the node #1 passes-through the measurement light received from the node #2, to the node #0 (operation P98 in FIG. 24).

The node #0 receives at the measurement light receiver 36 the measurement light which is looped back at the node #2 and is passed-through the node #1. The dispersion analyzer 364 of the measurement light receiver 36 measures total OMD (total) for the spans #1 and #2 by analyzing wavelength dependence on a phase of the received measurement light (operation P99 in FIG. 24).

Here, it is assumed that the downstream CD and the upstream CD for the spans #1 and #2 are equivalent. In this case, the CD(#2) at the node #2 for the span #2 may be determined with the following mathematical expression 20, based on the measured CD(total) and the CD(#1) for the span #1 (operation P100 in FIG. 24):

$$CD(\#2) = \frac{CD(\text{total}) - 2 \times CD(\#1)}{2} \quad \text{(Mathematical expression 20)}$$

[Measurement of CD(#3) Between Nodes #2 and #3]

Then, to measure CD(#3) at the node #3 (for a span #3: see FIG. 23) between the nodes #2 and #3, the intensity-modulated measurement light is added from the measurement light transmitter 35 of the node #0 to light to be transmitted to the node #1 (operations P94 and P95 in FIG. 24).

As exemplarily illustrated in FIG. 15, the node #1 passes-through the measurement light received from the node #0, to the downstream node #2 and the node #2 passes-through the measurement light received from the node #1 to the downstream node #3 (operation P96 in FIG. 24).

As exemplarily illustrated in FIG. 15, the node #3 loops back the measurement light received from the node 2 to the upstream (operation P97 in FIG. 24).

The node #2 passes-through the measurement light received from the node #3 and similarly, the node #1 passes-through the measurement light received from the node #2, to the node #0 (operation P98 in FIG. 24).

The node #0 receives at the measurement light receiver 36 the measurement light which is looped back at the node #3 and is passed-through the nodes #2 and #1, respectively. The dispersion analyzer 364 of the measurement light receiver 36 analyzes a polarized wave state of the received measurement light and measures total CD(total) for the spans #1 to #3 (operation P99 in FIG. 24).

Here, it is assumed that the downstream CD and the upstream CD for the spans #1 to #3 are equivalent. In this case, the CD(#3) at the node #3 for the span #3 may be determined with the following mathematical expression 21, based on the measured CD(total), and the CD(#1) for the span #1 and the CD(#2) for the span #2 (operation P100 in FIG. 24):

$$CD(\#3) = \frac{CD(\text{total}) - 2 \times CD(\#1) - 2 \times CD(\#2)}{2} \quad \text{(Mathematical expression 21)}$$

[Generalization of a Method for Measuring CD]

Figure 23:
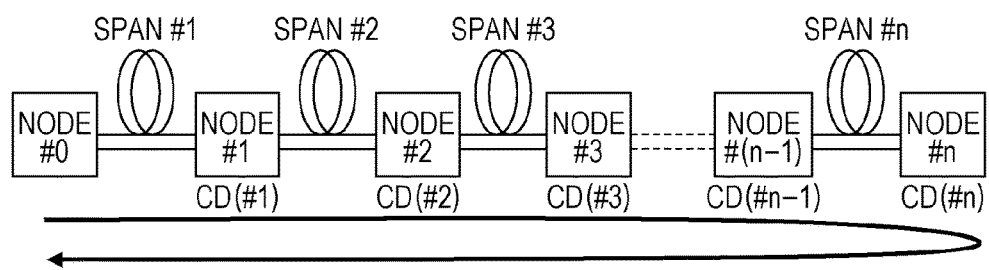
FIG. 23 is a view for generalizing and describing a method for measuring CD in the optical transmission system exemplarily illustrated in FIG. 1 to FIG. 3.

As exemplarily illustrated in FIG. 23 and FIG. 24, CD(#k) at the node #k for the span #k between the node #(k−1) and the node #k may be determined by repeating measurement while sequentially changing the loop-back node #k in a range of k=1 to n.

For example, as exemplarily illustrated in FIG. 13, the CD(#1) between the nodes #0 and #1 (span #1) is first measured (operations P91 to P93 in FIG. 24). Then, the CD(#k) for the span #k is repeatedly measured by sequentially changing a value of k in a range of 2 to n (operations P94 to P101 in FIG. 24).

For example, the node #0 adds the intensity-modulated measurement light from the measurement light transmitter 35 to light to be transmitted to the node #1 (operation P95 in FIG. 24).

The nodes #1 to #(k−1) pass-through the measurement light received from the node #0, to the downstream node #k (operation P96 in FIG. 24).

The node #k loops back the measurement light received from the node #(k−1) to the upstream (operation P97 in FIG. 24).

The nodes #(k−1) to #1 pass-through the measurement light received from the node #k to the node #0 (operation P98 in FIG. 24).

The node #0 receives at the measurement light receiver 36 the measurement light which is looped back at the node #2 and is passed-through the nodes #(k−1) to #1. The dispersion analyze 364 of the measurement light receiver 36 analyzes a polarized wave state of the received measurement light and measures total CD(total) for the spans #1 to #k (operation P99 in FIG. 24).

Here, it is assumed that the downstream CD and the upstream CD for the spans #1 to #k are equivalent. In this case, the CD(#k) at the node #k for the span #k may be determined with the following mathematical expression 22, based on the measured CD(total) and the CD(#1) to the CD(#k−1) for the spans #1 to #k (operation P100 in FIG. 24):

$$CD(\#k) = \frac{CD(\text{total}) - 2 \times \sum_{k=1}^{n} CD(\#k)}{2}$$ (Mathematical expression 22)

Note that the CD(#k) for the span #k may be determined with the above mathematical expression 22 even when nodes with different configurations are present in the nodes #1 to #n. For example, even when a node that has an ILA but has no OADM function is present in the nodes #1 to #n, the CD(#k) for the span #k may be determined with the above mathematical expression 22.

Total CD on a path from a certain node #k to other node #m (m=any from 1 to n and m>k) may be determined with the following mathematical expression 23, based on the CD(#k) at each measured node #k.

$$\text{Total } CD_{k \to m} = \sum_{k+1}^{m} CD(\#k)$$ (Mathematical expression 23)

For example, as illustrated in FIG. 18, CD at the node #4 on a path from the node #1 to the node #4 by way of the node #2 and the node #3 may be determined with the following mathematical expression 24: (Mathematical expression 24)

$$CD_{1 \to 4} = CD(\#2) + CD(\#3) + CD(\#4)$$

As described above, according to the embodiments described above, characteristics of respective nodes #i forming the optical network 1 or desired span characteristics may be understood only through provision of the node #0 having one measurement function in the optical network 1. Therefore, a network parameter may be optimized by understanding a difference between a design value and an observation value of the network parameter. Consequently, the transmission performance of the optical network 1 may be improved or risk may be reduced.

In addition, in the examples described above, the examples of sequentially changing the loop-back node #k from a direction closer to the measurement node #0 to a direction farther from the measurement node #0 (in a direction in which k increases) are described. However, to the contrary, the look-back node #k may be sequentially changed from the direction farther from the loop-back node #k to the direction closer to the loop-back node #k (in a direction in which k decreases). Also in this case, similar to the example described above, a network parameter of any span #k may be measured. In addition, changing of the loop-back node #k may not be sequential, and the loop-back node #k may be changed to any node #k.

[Period of Implementation of Network Parameter Measurement]

The measurement of a network parameter as described above may be implemented when the optical network 1 is initially started or may be implemented in operation of the optical network 1.

[At the Time of Initial Startup]

Figure 25:
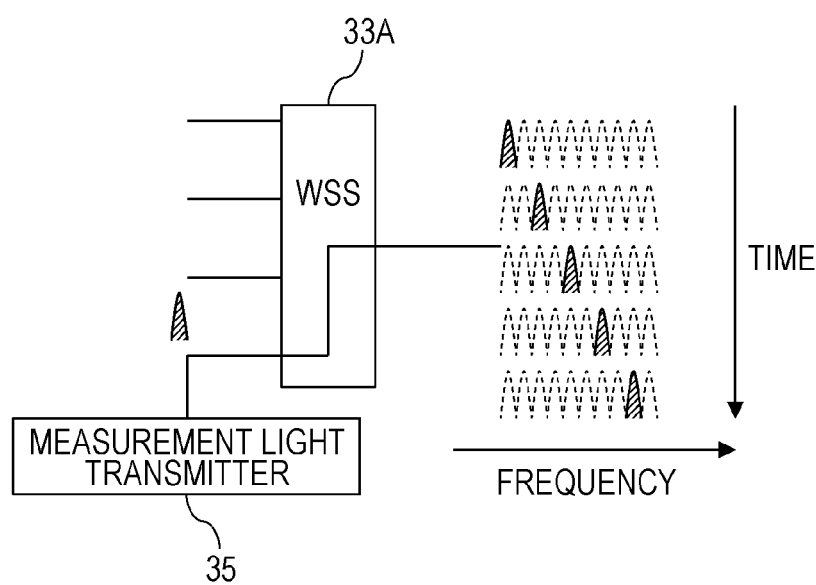
FIG. 25 is a view for describing wavelength sweep control of measurement light when the optical transmission system exemplarily illustrated in FIG. 1 to FIG. 3 is initially started.

Since all of wavelength bands to be used in the optical network 1 is empty when the optical network 1 is initially started, as exemplarily illustrated in FIG. 25, a wavelength (measurement wavelength) of a TLD 351 of the measurement light transmitter 35 is sweep-controlled across all bands. In conjunction with the sweep control, a selection wavelength at the WSSs 33 related to loop-back or pass-through of measurement light is switched (sweep-controlled).

Figure 26:
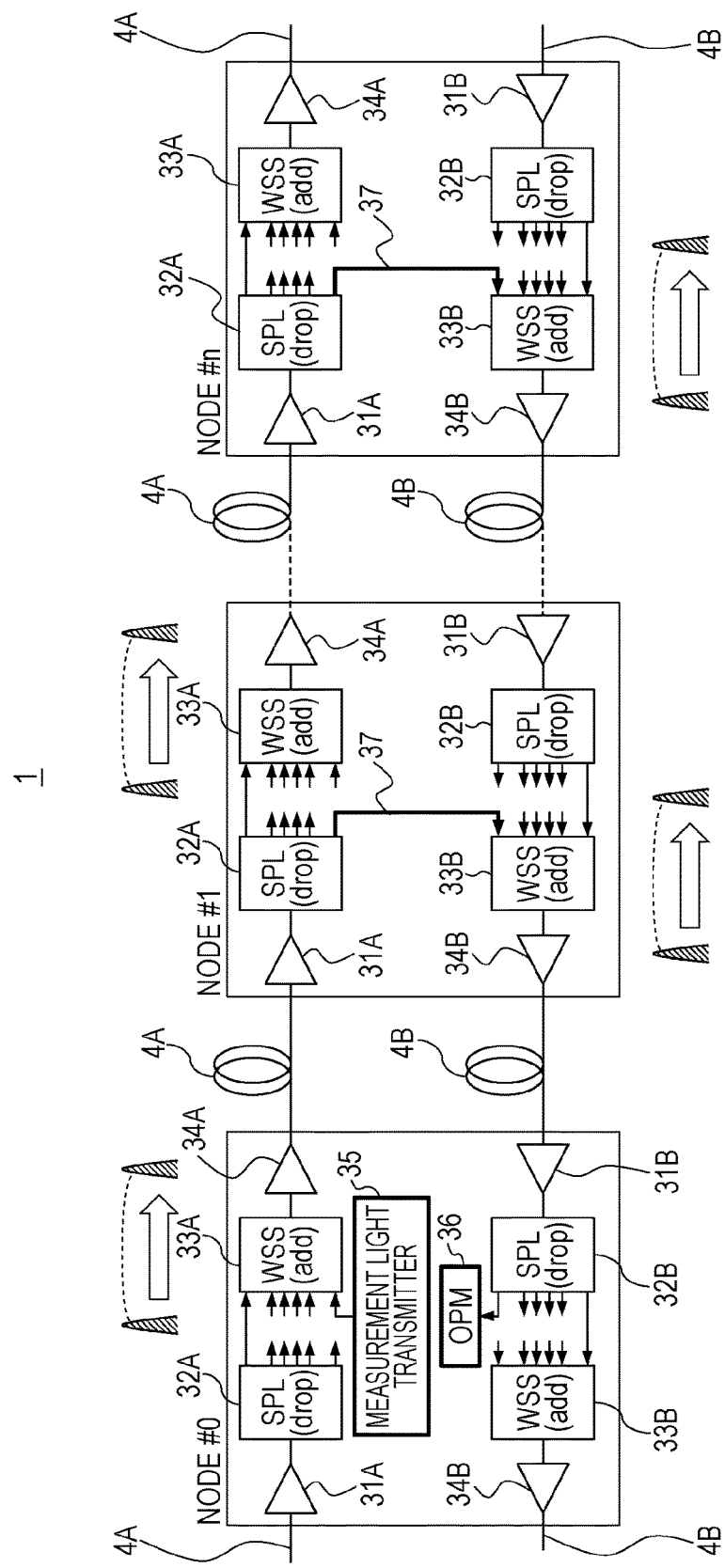
FIG. 26 is a view for describing wavelength sweep control of measurement light when the optical transmission system exemplarily illustrated in FIG. 1 to FIG. 3 is initially started.

For example, as exemplarily illustrated in FIG. 26, the WSS 33A at the measurement node #0, the WSS 33A and WSS 33B at the node #1, and the WSS 33B at the node #n are a target of sweep control of each selection wavelength. The sweep control may be implemented by the control unit 39, as already described.

This enables the measurement of a network parameter as already described for wavelengths in all bands of the optical network 1.

Figure 27:
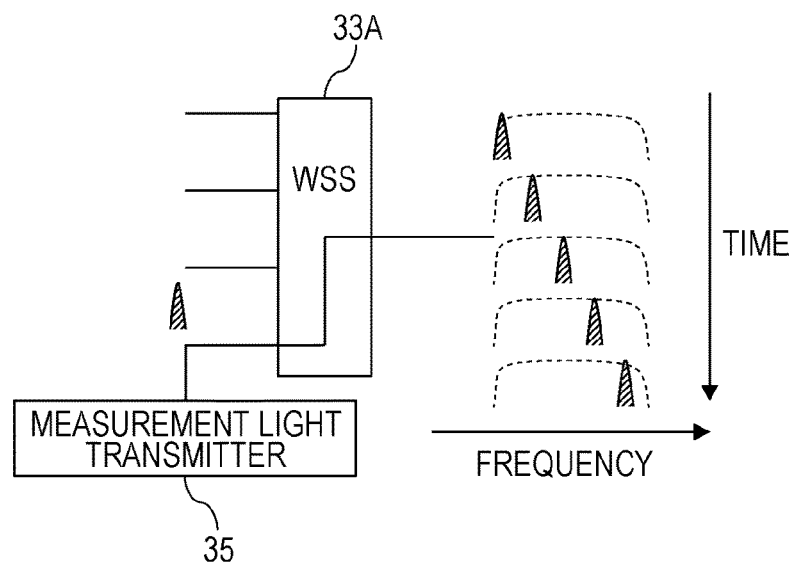
FIG. 27 is a view for describing wavelength sweep control when a wavelength selective switch (WSS) exemplarily illustrated in FIG. 25 is a WSS of LCOS type.

Note that a WSS of a liquid-crystal-on-silicon (LCOS) type or of an MEMS type may be applied to the WSSs 33. In the WSS 33 of the LCOS type, as schematically illustrated in FIG. 27, control is possible so that light of all bands (C band or the like, for example) may transmit without depending on a wavelength.

In this case, when the TLD 351 is sweep-controlled, measurement of a network parameter for the entire band of the optical network 1 becomes possible. Since all bands may be measured independent of a wavelength grid, measurement of a network parameter may be possible even in a flex grid. In addition, since it is desirable not to switch a selection wavelength of the WSSs 33, control when a measurement wavelength is changed becomes easier, and measurement time may be reduced. Furthermore, since there is no influence of a passband, a network parameter between wavelength grids may be measured with precision.

[In Operation]

Figure 28:
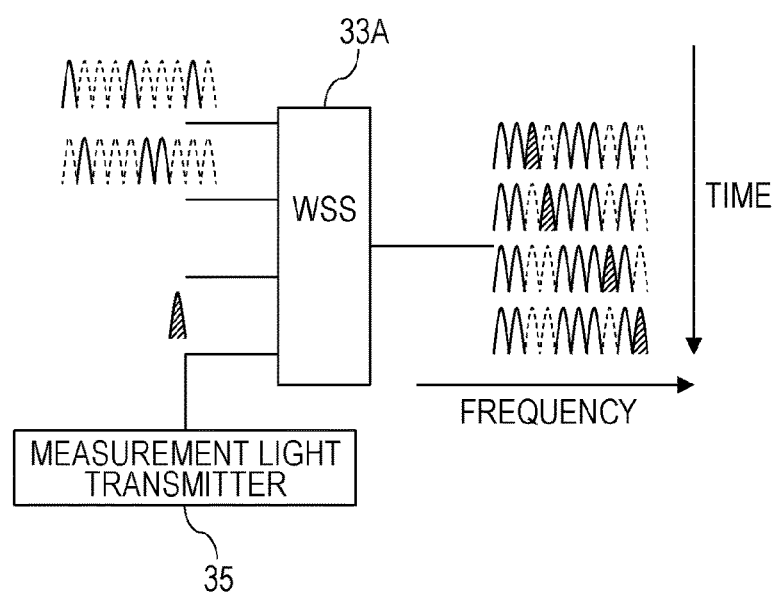
FIG. 28 is a view for describing wavelength assignment of measurement light while the optical transmission system exemplarily illustrated in FIG. 1 to FIG. 3 is in operation.
Figure 29:
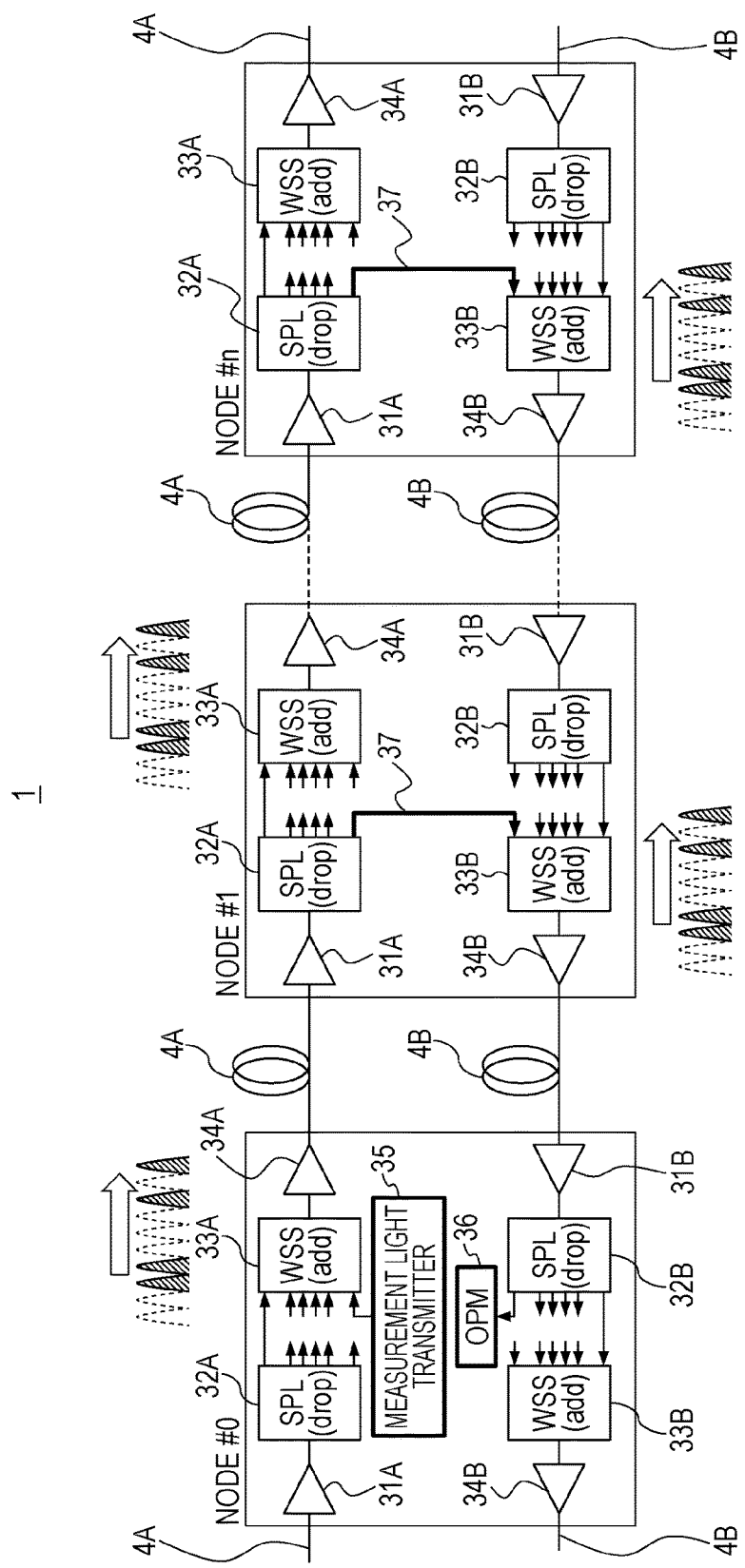
FIG. 29 is a view for describing wavelength assignment of measurement light while the optical transmission system exemplarily illustrated in FIG. 1 to FIG. 3 is in operation.

In operation of the optical network 1, as schematically illustrated in FIG. 28 and FIG. 29, measurement may be performed by sequentially switching an output wavelength (measurement wavelength) of the TLD 351 and a selection wavelength at the WSSs 33 for an unused wavelength (empty channel).

Figure 30:
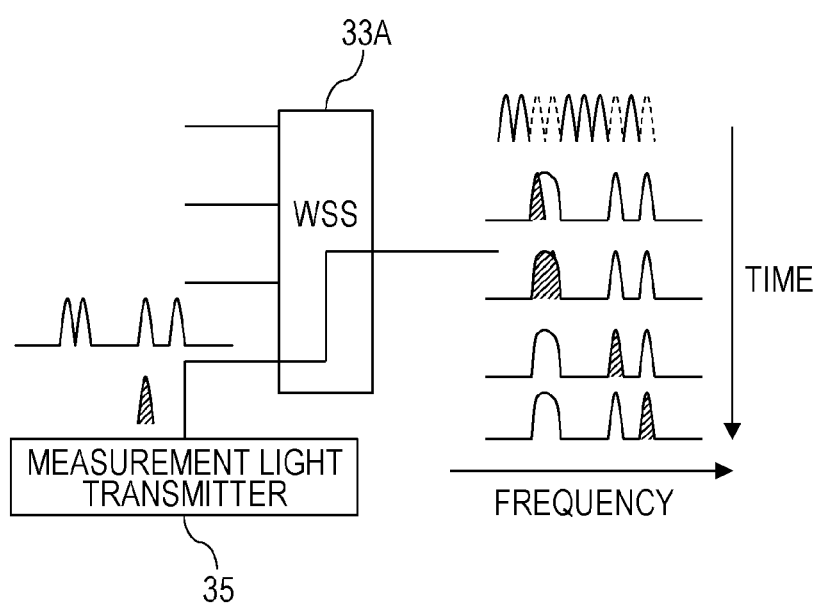
FIG. 30 is a view for describing wavelength assignment of measurement light when a wavelength selective switch (WSS) exemplarily illustrated in FIG. 28 is a WSS of LCOS type.

Note that for wavelength selection at the WSSs 33, one channel each may be controlled in conjunction with output wavelength control of the TLD 351 or a plurality of empty channels may be all assigned in advance to measurement light. For example, for the WSSs 33 of the LCOS type, as schematically illustrated in FIG. 30, an output wavelength of the TLD 351 may be sweep-controlled for an empty channel, rather than controlling the selection wavelength at the WSSs 33 in terms of a channel.

As described above, even in operation of the optical network 1, by assigning measurement light to an empty channel, a network parameter for the channel may be measured.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission system comprising:
   a first optical transmission device including
      a wavelength selective switch (WSS) having a plurality of input ports and an output port, wherein
         the plurality of input ports include
            input ports to receive channel lights, respectively, and
            a respective input port to receive measurement light generated by the first optical transmission device,
         the WSS is controllable to output the received measurement light from the output port, and
         the first optical transmission device is configured to transmit light which includes at least the measurement light and is output from the output port of the WSS, to an optical transmission line that transmits the light which includes at least the measurement light in a first direction; and
   a second optical transmission device comprising
      a first device which is an optical splitter or a WSS, and includes
         an input port to receive the light which includes at least the measurement light transmitted by the optical transmission line, and
         a plurality of output ports, and
      a second device which is an WSS including a plurality of input ports and an output port, wherein
   the second optical transmission device provides a loop-back connection between a respective output port of the plurality of output ports of the first device and a respective input port of the plurality of input ports of the second device, so that the measurement light included in the light received by the input port of the first device
      is provided from the respective output port of the plurality of output ports of the first optical device to the respective input port of the plurality of input ports of the second device,
      then output from the output port of the second device, and
      then transmitted by the second optical transmission device to the first optical transmission device through an optical transmission line that transmits light transmitted by the second optical transmission device in a second direction,
   so that the measurement light is thereby looped-back by the second optical transmission device to the first optical transmission device, and
   the first optical transmission device receives the measurement light loop-backed by the second optical transmission device and is configured to measure an optical transmission characteristic between the first optical transmission device and the second optical transmission device in accordance with the received measurement light, wherein the measuring the optical transmission characteristic comprises at least one of:
      measuring an optical signal-to-noise ratio (OSNR) of the received measurement light, and measuring an OSNR between the first optical transmission device and the second optical transmission device in accordance with the measured OSNR of the received measurement light,
      measuring optical power variations of the received measurement light, and measuring a polarization dependent loss (PDL) between the first optical transmission device and the second optical transmission device in accordance with the measured optical power variations of the received measurement light,
      analyzing a polarized wave state of the received measurement light, and measuring a polarization mode dispersion (PMD) between the first optical transmission device and the second optical transmission device in accordance with the analyzed polarized wave state of the received measurement light, and
      analyzing a wavelength dependence on a phase of the received measurement light, and measuring chromatic dispersion (CD) between the first optical transmission device and the second optical transmission device in accordance with the analyzed wavelength dependence on a phase of the received measurement light,
   wherein the measurement light is at a wavelength in a wavelength band that is a measurement target of the optical transmission characteristic.

2. The optical transmission system according to claim 1, wherein the first optical transmission device varies the wavelength of the measurement light in the wavelength band.

3. The optical transmission system according to claim 2, wherein the first optical transmission device varies the wavelength of the measurement light over the entire wavelength band when the optical transmission system is initially started up.

4. The optical transmission system according to claim 2, wherein the first optical transmission device controls the wavelength of the measurement light so as to use an unused wavelength in the wavelength band while the optical transmission system is in operation.

5. The optical transmission system according to claim 1, further comprising:
   a third optical transmission device arranged between the first optical transmission device and the second optical transmission device, the third optical transmission device comprising:
      a first device which is an optical splitter or a WSS, and includes
         an input port to receive the light which includes at least the measurement light transmitted by the optical transmission line that transmits light in the first direction, and
         a plurality of output ports, and
      a second device which is an WSS including a plurality of input ports and an output port, wherein
   the third optical transmission device provides a loop-back connection between a respective output port of the plurality of output ports of the first device and a respective input port of the plurality of input ports of the second device, so that the measurement light included in the light received by the input port of the first device
      is provided from the respective output port of the plurality of output ports of the first optical device to the respective input port of the plurality of input ports of the second device,
      then output from the output port of the second device, and then transmitted by the second optical transmission device to the first optical transmission device through the optical transmission line that transits-transmits light in the second direction, so that the measurement light is thereby looped-back by the second optical transmission device to the first optical transmission device, wherein the third optical transmission device and the second optical transmission device consecutively loop back the measurement light to the first optical transmission device, and the first optical transmission device receives the measurement light loop-backed by the third optical transmission device and measures the optical transmission characteristic in accordance with the received measurement light looped back by the third optical transmission device and the received measurement light looped back by the second optical transmission device.

6. An optical transmission device comprising:

a first device which is an optical splitter or a wavelength selective switch (WSS), and includes
  an input port to receive light which includes at least measurement light transmitted through a first optical transmission line in a first direction, and
  a plurality of output ports, and a second device which is a WSS including a plurality of input ports and an output port, wherein
  the optical transmission device provides a loop-back connection between a respective output port of the plurality of output ports of the first device and a respective input port of the plurality of input ports of the second device, so that the measurement light included in the light received by the input port of the first device is provided from the respective output port of the plurality of output ports of the first optical device to the respective input port of the plurality of input ports of the second device, then output from the output port of the second device, and then transmitted by the optical transmission device to a second optical transmission line that transmits light transmitted by the optical transmission device in a second direction, so that the measurement light is thereby looped-back by the optical transmission device from the first transmission line to the second transmission line to measure an optical transmission characteristic that is at least one of:

an optical signal-to-noise ratio (OSNR) in accordance with a measured OSNR of the looped-back measurement light, a polarization dependent loss (PDL) in accordance with measured optical power variations of the looped-back measurement light, a polarization mode dispersion (PMD) in accordance with an analyzed polarized wave state of the looped-back measurement light, and a chromatic dispersion (CD) in accordance with an analyzed wavelength dependence on a phase of the looped-back measurement light, wherein the measurement light is at a wavelength in a wavelength band that is a measurement target of the optical transmission characteristic.

7. An optical transmission device comprising: a wavelength selective switch (WSS) having a plurality of input ports and an output port, wherein
  the plurality of input ports include input ports to receive channel lights, respectively, and
  a respective input port to receive measurement light generated by the first optical transmission device,
  the WSS is controllable to output the received measurement light from the output port, and
  the optical transmission device is configured to transmit light which includes at least the measurement light and is output from the output port of the WSS, to an optical transmission line that transmits the light which includes at least the measurement light in a first direction; and
  a receiver configured to receive the measurement light after being loop-backed to the optical transmission device by another optical transmission device through a transmission line that transmits the looped back measurement light in a second direction, and to measure an optical transmission characteristic between the optical transmission device and the another optical transmission device in accordance with the received measurement light, wherein the measuring the optical transmission characteristic comprises at least one of:

measuring an optical signal-to-noise ratio (OSNR) of the received measurement light, and measuring an OSNR between the optical transmission device and the another optical transmission device in accordance with the measured OSNR of the received measurement light, measuring optical power variations of the received measurement light, and measuring a polarization dependent loss (PDL) between the optical transmission device and the another optical transmission device in accordance with the measured optical power variations of the received measurement light, analyzing a polarized wave state of the received measurement light, and measuring a polarization mode dispersion (PMD) between the optical transmission device and the another optical transmission device in accordance with the analyzed polarized wave state of the received measurement light, and analyzing a wavelength dependence on a phase of the received measurement light, and measuring chromatic dispersion (CD) between the optical transmission device and the another optical transmission device in accordance with the analyzed wavelength dependence on a phase of the received measurement light, wherein the measurement light is at a wavelength in a wavelength band that is a measurement target of the optical transmission characteristic.

* * * * *